(12) United States Patent
Cutler

(10) Patent No.: US 6,980,938 B2
(45) Date of Patent: Dec. 27, 2005

(54) METHOD FOR REMOVAL OF PID DYNAMICS FROM MPC MODELS

(75) Inventor: Charles R. Cutler, Houston, TX (US)

(73) Assignee: Cutler Technology Corporation, San Antonio, TX (US)

( * ) Notice: Subject to any disclaimer, the term of this patent is extended or adjusted under 35 U.S.C. 154(b) by 702 days.

(21) Appl. No.: 10/043,473

(22) Filed: Jan. 10, 2002

(65) Prior Publication Data

US 2003/0195665 A1 Oct. 16, 2003

(51) Int. Cl.$^7$ .............................................. G06F 17/50
(52) U.S. Cl. ............................... 703/2; 703/6; 700/39; 700/44
(58) Field of Search ................... 703/2, 6; 700/39, 700/44; 702/20, 183

(56) References Cited

U.S. PATENT DOCUMENTS

| | | | | |
|---|---|---|---|---|
| 4,349,869 A | * | 9/1982 | Prett et al. .................... | 700/39 |
| 4,616,308 A | * | 10/1986 | Morshedi et al. ............. | 700/39 |
| 5,347,446 A | | 9/1994 | Iino et al. | |
| 5,566,065 A | * | 10/1996 | Hansen et al. ................ | 700/44 |
| 5,568,378 A | * | 10/1996 | Wojsznis ..................... | 700/44 |
| 6,056,781 A | | 5/2000 | Wassick et al. | |
| 6,088,630 A | | 7/2000 | Cawlfield et al. | |
| 6,347,254 B1 | * | 2/2002 | Lu .............................. | 700/29 |

OTHER PUBLICATIONS

Patry, et al. ; Model Predictive Controller Design with Process Constraints and implicit Economic Criteria. IEEE Instr. & Meas. Tech. Conf. May 1997. Pages 559–563.

* cited by examiner

Primary Examiner—Thai Phan
(74) Attorney, Agent, or Firm—Michael A. Ervin

(57) ABSTRACT

A method is disclosed for removing the dynamics of the PID controllers from a Model Predictive Controller that was developed using identification testing of a process. This allows creation of valve-based off-line process simulators and provides methods to generate new MPC controllers for complex multivariable process control when a change has been made in any PID control configuration or tuning and to do so without having to conduct new identification testing of the process.

17 Claims, 5 Drawing Sheets

METHOD FOR REMOVAL OF PID DYNAMICS FROM MPC MODELS

CROSS REFERENCE TO RELATED APPLICATIONS

Not applicable

STATEMENT REGARDING FEDERALLY SPONSORED RESEARCH AND DEVELOPMENT

Not applicable

BACKGROUND OF THE INVENTION

Model Predictive Control (MPC) refers to a class of algorithms that compute a sequence of manipulated variable adjustments in order to optimize the future behavior of complex multivariable processes. Originally developed to meet the needs of petroleum refineries and chemical processes, MPC can now be found in a wide variety of application areas including chemicals, food processing, automotive, aerospace, metallurgy, and pulp and paper. A well-known implementation of MPC in chemical and refinery applications is Dynamic Matrix Control or DMC.

The MPC Controller employs a software model of the process to predict the effect of past changes of manipulated variable and measurable disturbances on the output variables of interest. The independent variables are computed so as to optimize future system behavior over a time interval known as the prediction horizon. In the general case any desired objective function can be used for the optimization. The system dynamics are described by an explicit process model, which can take, in principle, a number of different mathematical forms. Process input and output constraints are included directly in the problem formulation so that future constraint violations are anticipated and prevented.

In practice a number of different approaches have been developed and commercialized in implementing MPC Controllers. The most successful implementations have made use of a linear model for the plant dynamics. The linear model is developed in a first step by gathering data on the process by introducing test disturbances on the independent variables and measuring the effects of the disturbances on the dependent variables. This initial step is referred to as Identification and the novel use of this identification data is the essence of this invention.

U.S. Pat. Nos. 4,349,869 and 4,616,308 describe an implementation of MPC control called Dynamic Matrix Control (DMC). These patents describe the MPC algorithms based on linear models of a plant and describe how process constraints are included in the problem formulation. Initial identification of the MPC controller using process data is also described.

By way of further background this Identification of process dynamics requires a pre-test in which the independent variables of the process are moved in some pattern to determine the effect on the dependent variables. In a chemical or refinery process the independent variables include the PID (proportional-integral-derivative) controller set points for selected dependent variables, the valve positions of PID controllers in manual, and temperatures, material flows, pressures and compositions that are determined outside the scope of the controller's domain. For any process Identification test, the independent variables are fixed for the analysis of the data. Further the tuning of any of the PID controllers in the domain of the MPC controller is fixed. The MPC controller that is built to use the dynamic process models from the Identification must have exactly the same configuration of independent variables that existed when the Identification was performed. Thus the PID controller configuration that is present during Identification imbeds the PID controller dynamics in the dynamic model.

This characteristic of current Identification technology represents an unsolved problem that is addressed by this invention. The problem creates a limitation on the use of MPC technology that manifests itself in two different areas.

The first application area is MPC itself. Because the dynamics of the PID controllers are imbedded in the MPC model, any change in the tuning of a PID controller or changing of the PID state from auto to manual or vice versa changes the dynamic model. To correct this it has been required to retest the process unit with the changed conditions. A well-designed Identification test for a complex multivariable process will be a 2–3 week effort with skilled people, costing two to three hundred thousand dollars.

The second application area is in the field of Operator Training Simulators. Effective training simulators are important to the chemical process industry. The large investments in new chemical processes and the safety implications of the complex processes require a well-trained operator group. This is important especially for process units that remain on computer control for extended periods of time, since the operators do not have the opportunity to control the unit. MPC models have not been used in creating training simulators because of the aforementioned problem that the PID controller configuration that is present during Identification imbeds the PID controller dynamics in the dynamic model. The result of this is that authentic training is difficult because the operators cannot change the state (auto or manual) of the PID controllers without reducing the fidelity of the model. Current state of the art training simulators are based on approximated first principle engineering equations that have been simplified to such a degree that they do not represent the actual process dynamics. A survey of control rooms in the chemical process industry will reveal that they are rarely used after a start-up as the operating personnel learn that the simulator does not reflect the actual dynamic behavior. A training simulator based on an identification model that has the fidelity to hold a process at constraints, display all temperatures, pressures, flows, and valve positions and allow the operator to switch any PID controller to manual or auto would be a powerful tool for training.

Numerous unsuccessful attempts have been made by practitioners in the field to address this identification issue. One approach would be to run the identification test with the regulatory control scheme in manual. This of course fails because there are not enough operators available to handle a complex process with 50 to 100 PID controllers on manual. Other attempts have been made to conduct a standard identification test with the regulatory scheme in place but to then set up the model with the valve positions as the independent variables. These approaches always lead to failure with erratic results. It has become recognized that this approach fails because the valve positions are correlated through the PID dynamics via measured and unmeasured disturbances that are always present in a real world identification test and are thus not independent.

The recognition of this fact and the method of removing the noise and unmeasured disturbances from the data set are the essence of this invention. The method of removing the noise and unmeasured disturbances is a procedural one. The process is first identified with a commercial tool such as AspenTech's DMC-Model. This step breaks the correlation between the unmeasured disturbances, the noise, and the PID controllers. The PID controller dynamics can then be removed from the resulting model without interference from the noise and unmeasured disturbances.

BRIEF SUMMARY OF THE INVENTION

An object of this invention is to provide a method for removing the dynamics of the PID controllers from the MPC controller used in a multivariable control process. This allows creation of valve-based off-line process simulators.

It is a further object of this invention to provide such a method that can be used in various implementations of MPC controllers.

It is a further object of this invention to provide a method to generate new MPC controllers for complex multivariable process control when a change has been made in any PID control configuration or tuning and to do so without having to conduct new identification testing of the process.

It is a further object of this invention to generate a process simulator based on valve positions with the effect of unmeasured disturbances removed so that a high fidelity process simulator is available for process simulation and training. Such a simulator could be used for simulation in any controller configuration and with various tuning configurations on each individual controller.

In accordance with this invention there is provided a method used in model predictive control applications for removing PID controller dynamics from a controller model of a process having a plurality of independently controllable, manipulated variables and at least one controlled variable dependent upon the independently controllable, manipulated variables that includes at least the steps of: gathering data about the process by separately introducing a test disturbance in each of the manipulated variables and measuring the effect of the disturbances on the controlled variable; using the effects of the disturbances on the controlled variable to generate a first linearized matrix model relating the at least one controlled variable to the independently controllable, manipulated variables; interchanging selected valve position controlled variables with their corresponding selected independently controllable, manipulated PID controller set point variables in the linearized model using matrix row elimination mathematics to generate a second linearized model that has a new set of independently controllable, manipulated variables, the second model having the dynamics of the selected independently controllable, manipulated PID controller set point variables removed from the model.

To use this model in a control context the method includes controlling a process having a plurality of independently controllable, manipulated variables and at least one controlled variable dependent upon the independently controllable, manipulated variables including the steps of: gathering data about the process by separately introducing a test disturbance in each of the manipulated variables and measuring the effect of the disturbances on the controlled variable; using the effects of the disturbances on the controlled variable to generate a first linearized dynamic model relating the at least one controlled variable to the independently controllable, manipulated variables; interchanging selected valve position controlled variables with their corresponding selected independently controllable, manipulated PID controller set point variables in the first linearized dynamic model using matrix row elimination mathematics to generate a second linearized dynamic model that has a new set of independently controllable, manipulated variables, the second linearized dynamic model having the dynamics of the selected independently controllable, manipulated PID controller set point variables removed from the second linearized dynamic model; measuring the present value of the variables; calculating for discrete intervals of time from the gathered data about the process, the measured present values and pre-selected operating constraints a set of moves for present and future times for at least the manipulated variables to obtain new values for the manipulated variables and to move the at least one dependent controllable variable towards at least one of the constraints; and changing the process by adjusting the manipulated variables for the set of moves for present and future times to cause the process to move the at least one dependent controllable variable towards at least one of the constraints.

To use this invention to generate new MPC controllers for complex multivariable process control when a change has been made in any PID control configuration or tuning and to do so without having to conduct new identification testing of the process the following process can be used: by interchanging at least one PID controller set point variable in an original linearized dynamic model with its corresponding valve position controlled variable in the original linearized dynamic model using matrix row elimination mathematics to generate a secondary linearized dynamic model that has the at least one corresponding valve position as a new independently controllable, manipulated variable; then externally emulating new desired PID tuning via mathematical emulator to emulate the effect of the at least one PID controllers new tuning with the secondary linearized dynamic model; then testing the secondary linearized dynamic model with it's emulated PID tuning by stepping each of it's manipulated variables to obtain the new linearized dynamic model that will now contain the dynamics of the at least one PID controllers.

It should be noted that a regulatory control scheme can be easily emulated external to the process model via a DCS console or console emulator available in modern control packages. This allows the operator to put PID controllers in Manual-mode, break cascades, retune PID controller, or even re-configure the regulatory control scheme.

To use this invention to generate a process simulator based on valve positions with the effect of unmeasured disturbances removed so that a high fidelity process simulator is available for process simulation and training the following method is used: first gathering data about the process by separately introducing a test disturbance in each of the manipulated variables and measuring the effect of the disturbances on the controlled variable; then using the effects of the disturbances on the controlled variable to generate a first linearized dynamic model relating the at least one controlled variable to the independently controllable, manipulated variables; then interchanging each independently controllable, manipulated PID controller set point variable with its corresponding valve position controlled variable in the first linearized dynamic model using matrix row elimination mathematics to generate a second linearized dynamic model that has the corresponding valve positions as a new set of independently controllable, manipulated variables, the second linearized dynamic model having the dynamics of the selected independently controllable, manipulated PID controller set point variables removed from the second linearized dynamic model; then externally emulating a desired regulatory control schemes via mathematical emulators to emulate PID controllers in either manual, cascade, or automatic modes. As before it should be noted that a regulatory control scheme can be easily emulated external to the process model via a DCS console or console emulator available in modern control packages. This allows the operator to put PID controllers in Manual-mode, break cascades, retune PID controller, or even re-configure the regulatory control scheme.

The most common method of Identification currently used in oil refining and chemical processes is the Dynamic Matrix Identification (DMI). DMI will be used to illustrate the methodology of this invention, but it should be understood that the invention is not limited to a specific Identification technique.

DETAILED DESCRIPTION OF INVENTION

Figure 1:
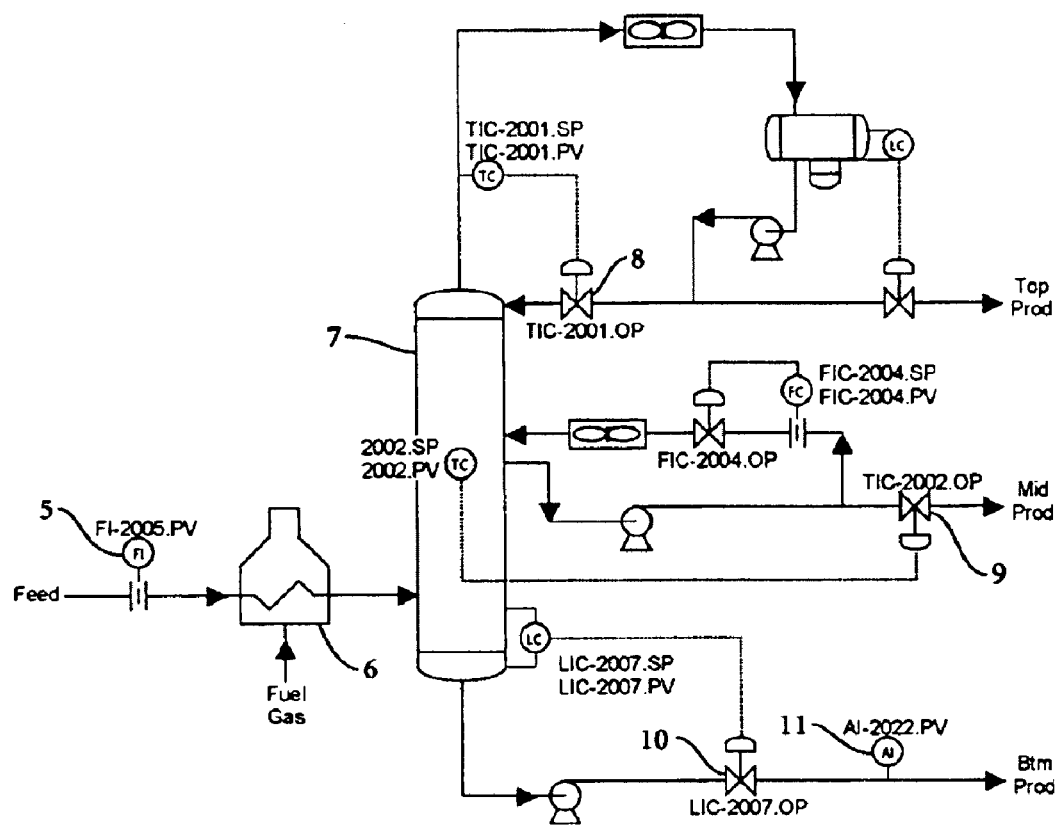
FIG. 1 is a complex flow schematic of a fractionator

The invention is a method used in conjunction with model predictive control for removing the dynamics of PID controllers from MPC controllers.

An MPC process model is a set of linear equations so it should be mathematically possible to interchange any independent variable with a dependent variable provided a relation exists between the independent and dependent variable. A candidate set for that transformation is the set point (independent) for a PID controller and the associated valve position (dependent) for that PID controller.

An MPC controller is often based on a linear model of a process system. Although the invention to be described here has applications in many fields the examples used will be from chemical and refinery process applications.

There are two types of variables in any system; the independent variables and the dependent variables. The independent variables are inputs to the system. The independent variables are further divided into manipulated and disturbance (feedforward) variables. Manipulated variables are those that can be changed by the human operator, such as valve positions or PID controller set points. Disturbance variables are those Independent variables that have an effect on the system, but cannot be changed by the human operator. Variables such as feed composition, feed temperature, and ambient temperature are examples of disturbance variables.

Dependent variables are outputs from the system. Dependent variables are affected by changes in the independent variables. The human operator cannot directly change them. The values of dependent variables can be controlled, however, by correctly changing the values of the manipulated variables. Further, as disturbances enter the system, the manipulated variables must be correctly adjusted to counteract the disturbance.

The use of linear models allows the use of matrix mathematics in describing complex and multivariable control.

There are several general formulations of MPC models. A general model for control is the step response model:

Equation 1: Step Response Dynamic Matrix, Block Matrix Form $$\delta \overline{O}_1 = A_{1,1} \Delta \overline{I}_1 + \cdots + A_{1,j} \Delta \overline{I}_j + \cdots + A_{1,nind} \Delta \overline{I}_{nind}$$
$$\vdots \quad \vdots \quad \vdots \quad \vdots \quad \vdots$$
$$\delta \overline{O}_i = A_{i,1} \Delta \overline{I}_1 + \cdots + A_{i,j} \Delta \overline{I}_j + \cdots + A_{i,nind} \Delta \overline{I}_{nind}$$
$$\vdots \quad \vdots \quad \vdots \quad \vdots \quad \vdots$$
$$\delta \overline{O}_{ndep} = A_{ndep,1} \Delta \overline{I}_1 + \cdots + A_{ndep,j} \Delta \overline{I}_j + \cdots + A_{ndep,nind} \Delta \overline{I}_{nind}$$

where, $$\delta \overline{O}_i = \begin{bmatrix} O_{i,1} - O_{i,0} \\ O_{i,2} - O_{i,0} \\ O_{i,3} - O_{i,0} \\ \vdots \\ O_{i,ncoef} - O_{i,0} \end{bmatrix},$$

the accumulative change in the $i^{th}$ dependent variable at each time step, $$\Delta \overline{I}_j = \begin{bmatrix} \Delta I_{j,1} \\ \Delta I_{j,2} \\ \Delta I_{j,3} \\ \vdots \\ \Delta I_{j,ncoef} \end{bmatrix},$$

the step change in the $j^{th}$ independent variable at each time step, and $$A_{i,j} = \begin{bmatrix} a_{i,j,1} & & & & \\ a_{i,j,2} & a_{i,j,1} & & & \\ a_{i,j,3} & a_{i,j,2} & a_{i,j,1} & & \\ \vdots & \vdots & \vdots & \ddots & \\ a_{i,j,ncoef} & a_{i,j,(ncoef-1)} & a_{i,j,(ncoef-2)} & \cdots & a_{i,j,1} \end{bmatrix},$$

the Dynamic Matrix.

An alternate form of this Step Response equation is the Finite Impulse Response (FIR) form. It can be derived from the Step Response form as described below.

Recalling from the definitions that:

$$b_{i,j,k} = a_{i,j,k} \text{ for } k=1,$$

$$b_{i,j,k} = a_{i,j,k} - a_{i,j,(k-1)} \text{ for } k:2 \rightarrow ncoef$$

and that $$\Delta O_{i,k} = O_{i,k} - O_{i,(k-1)} \text{ for } k:1 \rightarrow ncoef$$

we can difference the above system of equations to give:

Equation 2: Finite Impulse Response Equations-Block Matrix Form $$\Delta \overline{O}_1 = B_{1,1} \Delta \overline{I}_1 \cdots + B_{1,j} \Delta \overline{I}_j \cdots + B_{1,nind} \Delta \overline{I}_{nind}$$
$$\vdots \quad \vdots \quad \vdots \quad \vdots \quad \vdots$$
$$\Delta \overline{O}_i = B_{i,1} \Delta \overline{I}_1 \cdots + B_{i,j} \Delta \overline{I}_j \cdots + B_{i,nind} \Delta \overline{I}_{nind}$$
$$\vdots \quad \vdots \quad \vdots \quad \vdots \quad \vdots$$
$$\Delta \overline{O}_{ndep} = B_{ndep,1} \Delta \overline{I}_1 \cdots + B_{ndep,j} \Delta \overline{I}_j \cdots + B_{ndep,nind} \Delta \overline{I}_{nind}$$

where $$\Delta \overline{O}_i = \begin{bmatrix} O_{i,1} - O_{i,0} \\ O_{i,2} - O_{i,1} \\ O_{i,3} - O_{i,2} \\ \vdots \\ O_{i,ncoef} - O_{i,(ncoef-1)} \end{bmatrix},$$

the change in the $i^{th}$ dependent variable across each time interval, $$\Delta \overline{I}_j = \begin{bmatrix} \Delta I_{j,1} \\ \Delta I_{j,2} \\ \Delta I_{j,3} \\ \vdots \\ \Delta I_{j,ncoef} \end{bmatrix}$$

as above, and $$B_{i,j} = \begin{bmatrix} b_{i,j,1} & & & & \\ b_{i,j,2} & b_{i,j,1} & & & \\ b_{i,j,3} & b_{i,j,2} & b_{i,j,1} & & \\ \vdots & \vdots & \vdots & \ddots & \\ b_{i,j,ncoef} & b_{i,j,(ncoef-1)} & b_{i,j,(ncoef-2)} & \cdots & b_{i,j,1} \end{bmatrix},$$

the model matrix of Impulse Coefficients.

There are five forms of these equations, and we have shown only the first two. While these forms are mathematically equivalent, and while all forms may be used for identification prediction and control, they have very different properties.

$\delta \overline{O} = A \Delta \overline{I}$—Most often used for control calculations.
$\Delta \overline{O} = B \Delta \overline{I}$—Used for identification of steady state variables.
$\Delta \Delta \overline{O} = B \Delta \Delta \overline{I}$—Used for identification of ramp variables.
$\delta \overline{O} = B \delta \overline{I}$—Not commonly used. Old IDCOM control formulation.
$\Delta \overline{O} = A \Delta \Delta \overline{I}$—Not commonly used.

C. R. Cutler and C. R. Johnston discuss the properties of these forms of the matrix in a paper, "Analysis of the Forms of the Dynamic Matrix", in the Proceedings of the Instrument Society of America ISA 85 Advances in Instrumentation Volume 40, Number 1—October 1985.

The use of these linear modeling techniques, including the identification of the model and the use of the model for control and the use in control with constraints is described in two U.S. Pat. Nos. 4,349,869 and 4,616,308, These patents are incorporated herein by reference.

We will now derive the algorithm of this invention to demonstrate the removal of the PID dynamics from the controller. The derivation is from the FIR model of equation 2, To derive the algorithm, we assume that the $\hat{j}^{th}$ independent variable is the set point of a PID controller and the $\hat{i}^{th}$ dependent is the PID valve response to that set point change. We wish to re-constitute the model so that the valve is the independent variable in the process model; that is to say, we wish to remove the dynamics of this PID controller from all affected model responses. This can be accomplished by interchanging the $\hat{i}^{th}$ dependent variable with the $\hat{j}^{th}$ dependent variable, as follows:

$$\begin{bmatrix} B_{1,1} & \cdots & B_{1,(\hat{j}-1)} & B_{1,\hat{j}} & B_{1,(\hat{j}+1)} & \cdots & B_{1,nind} \\ \vdots & \ddots & \vdots & \vdots & \vdots & \ddots & \vdots \\ B_{(\hat{i}-1),1} & \cdots & B_{(\hat{i}-1),(\hat{j}-1)} & B_{(\hat{i}-1),\hat{j}} & B_{(\hat{i}-1),(\hat{j}+1)} & \cdots & B_{(\hat{i}-1),nind} \\ B_{\hat{i},1} & \cdots & B_{\hat{i},(\hat{j}-1)} & B_{\hat{i},\hat{j}} & B_{\hat{i},(\hat{j}+1)} & \cdots & B_{\hat{i},nind} \\ B_{(\hat{i}+1),1} & \cdots & B_{(\hat{i}+1),(\hat{j}-1)} & B_{(\hat{i}+1),\hat{j}} & B_{(\hat{i}+1),(\hat{j}+1)} & \cdots & B_{(\hat{i}+1),nind} \\ \vdots & \ddots & \vdots & \vdots & \vdots & \ddots & \vdots \\ B_{ndep,1} & \cdots & B_{ndep,(\hat{j}-1)} & B_{ndep,\hat{j}} & B_{ndep,(\hat{j}+1)} & \cdots & B_{ndep,nind} \end{bmatrix} \times$$

$$\begin{bmatrix} \Delta \overline{I}_1 \\ \vdots \\ \Delta \overline{I}_{(\hat{j}-1)} \\ \Delta \overline{I}_{\hat{j}} \\ \Delta \overline{I}_{(\hat{j}+1)} \\ \vdots \\ \Delta \overline{I}_{nind} \end{bmatrix} = \begin{bmatrix} I & \cdots & 0 & 0 & 0 & \cdots & 0 \\ \vdots & \ddots & \vdots & \vdots & \vdots & \ddots & \vdots \\ 0 & \ddots & I & 0 & 0 & \ddots & 0 \\ 0 & \ddots & 0 & I & 0 & \ddots & 0 \\ 0 & \ddots & 0 & 0 & I & \ddots & 0 \\ \vdots & \ddots & \vdots & \vdots & \vdots & \ddots & \vdots \\ 0 & \cdots & 0 & 0 & 0 & \cdots & I \end{bmatrix} \times \begin{bmatrix} \Delta \overline{O}_1 \\ \vdots \\ \Delta \overline{O}_{(\hat{i}-1)} \\ \Delta \overline{O}_{\hat{i}} \\ \Delta \overline{O}_{(\hat{i}+1)} \\ \vdots \\ \Delta \overline{O}_{ndep} \end{bmatrix}$$

where $$I = \begin{bmatrix} 1 & 0 & \cdots & 0 & 0 \\ 0 & 1 & \ddots & 0 & 0 \\ \vdots & & \ddots & & \vdots \\ 0 & 0 & \ddots & 1 & 0 \\ 0 & 0 & \cdots & 0 & 1 \end{bmatrix},$$

the Identity Matrix.

Note that this is nothing more than equation 2 above with an Identity matrix multiplying the $\Delta O$'s.

By performing row elimination operations (pivoting), we get;

$$\begin{bmatrix} \hat{B}_{1,1} & \cdots & \hat{B}_{1,(\hat{j}-1)} & 0 & \hat{B}_{1,(\hat{j}+1)} & \cdots & \hat{B}_{1,nind} \\ \vdots & \ddots & \vdots & \vdots & \vdots & \ddots & \vdots \\ \hat{B}_{(\hat{i}-1),1} & \cdots & \hat{B}_{(\hat{i}-1),(\hat{j}-1)} & 0 & \hat{B}_{(\hat{i}-1),(\hat{j}+1)} & \cdots & \hat{B}_{(\hat{i}-1),nind} \\ \hat{B}_{\hat{i},1} & \cdots & \hat{B}_{\hat{i},(\hat{j}-1)} & -I & \hat{B}_{\hat{i},(\hat{j}+1)} & \cdots & \hat{B}_{\hat{i},nind} \\ \hat{B}_{(\hat{i}+1),1} & \cdots & \hat{B}_{(\hat{i}+1),(\hat{j}-1)} & 0 & \hat{B}_{(\hat{i}+1),(\hat{j}+1)} & \cdots & \hat{B}_{(\hat{i}+1),nind} \\ \vdots & \ddots & \vdots & \vdots & \vdots & \ddots & \vdots \\ \hat{B}_{ndep,1} & \cdots & \hat{B}_{ndep,(\hat{j}-1)} & 0 & \hat{B}_{ndep,(\hat{j}+1)} & \cdots & \hat{B}_{ndep,nind} \end{bmatrix} \times \begin{bmatrix} \Delta \overline{I}_1 \\ \vdots \\ \Delta \overline{I}_{(\hat{j}-1)} \\ \Delta \overline{I}_{\hat{j}} \\ \Delta \overline{I}_{(\hat{j}+1)} \\ \vdots \\ \Delta \overline{I}_{nind} \end{bmatrix} =$$

$$\begin{bmatrix} I & \cdots & 0 & -\hat{B}_{1,\hat{j}} & 0 & \cdots & 0 \\ \vdots & \ddots & \vdots & \vdots & \vdots & \ddots & \vdots \\ 0 & \ddots & I & -\hat{B}_{(\hat{i}-1),\hat{j}} & 0 & \ddots & 0 \\ 0 & \ddots & 0 & -\hat{B}_{\hat{i},\hat{j}} & 0 & \ddots & 0 \\ 0 & \ddots & 0 & -\hat{B}_{(\hat{i}+1),\hat{j}} & I & \ddots & 0 \\ \vdots & \ddots & \vdots & \vdots & \vdots & \ddots & \vdots \\ 0 & \cdots & 0 & -\hat{B}_{ndep,\hat{j}} & 0 & \cdots & I \end{bmatrix} \times \begin{bmatrix} \Delta \overline{O}_1 \\ \vdots \\ \Delta \overline{O}_{(\hat{i}-1)} \\ \Delta \overline{O}_{\hat{i}} \\ \Delta \overline{O}_{(\hat{i}+1)} \\ \vdots \\ \Delta \overline{O}_{ndep} \end{bmatrix}$$

Which can be re-written as:

$$\begin{bmatrix} \hat{B}_{1,1} \\ \vdots \\ \hat{B}_{(\hat{i}-1),1} \\ \hat{B}_{\hat{i},1} \\ \hat{B}_{(\hat{i}+1),1} \\ \vdots \\ \hat{B}_{ndep,1} \end{bmatrix} \times \Delta \bar{I}_1 + \cdots + \begin{bmatrix} \hat{B}_{1,(\hat{j}-1)} \\ \vdots \\ \hat{B}_{(\hat{i}-1),(\hat{j}-1)} \\ \hat{B}_{\hat{i},(\hat{j}-1)} \\ \hat{B}_{(\hat{i}+1),(\hat{j}-1)} \\ \vdots \\ \hat{B}_{ndep,(\hat{j}-1)} \end{bmatrix} \times \Delta \bar{I}_{(\hat{j}-1)} + \begin{bmatrix} 0 \\ \vdots \\ 0 \\ -I \\ 0 \\ \vdots \\ 0 \end{bmatrix} \times \Delta \bar{I}_{\hat{j}} +$$

$$\begin{bmatrix} \hat{B}_{1,(\hat{j}+1)} \\ \vdots \\ \hat{B}_{(\hat{i}-1),(\hat{j}+1)} \\ \hat{B}_{\hat{i},(\hat{j}+1)} \\ \hat{B}_{(\hat{i}+1),(\hat{j}+1)} \\ \vdots \\ \hat{B}_{ndep,(\hat{j}+1)} \end{bmatrix} \times \Delta \bar{I}_{(\hat{j}+1)} \cdots + \begin{bmatrix} \hat{B}_{1,nind} \\ \vdots \\ \hat{B}_{(\hat{i}-1),nind} \\ \hat{B}_{\hat{i},nind} \\ \hat{B}_{(\hat{i}+1),nind} \\ \vdots \\ \hat{B}_{ndep,nind} \end{bmatrix} \times \Delta \bar{I}_{nind} = \begin{bmatrix} I \\ \vdots \\ 0 \\ 0 \\ 0 \\ \vdots \\ 0 \end{bmatrix} \times \Delta \overline{O}_1 + \cdots +$$

$$\begin{bmatrix} 0 \\ \vdots \\ I \\ 0 \\ 0 \\ \vdots \\ 0 \end{bmatrix} \times \Delta \overline{O}_{(\hat{i}-1)} + \begin{bmatrix} -\hat{B}_{1,\hat{j}} \\ \vdots \\ -\hat{B}_{(\hat{i}-1),\hat{j}} \\ -\hat{B}_{\hat{i},\hat{j}} \\ -\hat{B}_{(\hat{i}+1),\hat{j}} \\ \vdots \\ -\hat{B}_{ndep,\hat{j}} \end{bmatrix} \times \Delta \overline{O}_{\hat{i}} + \begin{bmatrix} 0 \\ \vdots \\ 0 \\ 0 \\ I \\ 0 \\ \vdots \\ 0 \end{bmatrix} \times \Delta \overline{O}_{(\hat{i}+1)} + \cdots + \begin{bmatrix} 0 \\ \vdots \\ 0 \\ 0 \\ 0 \\ \vdots \\ I \end{bmatrix} \times \Delta \overline{O}_{ndep}$$

Which can be rearranged to;

$$\begin{bmatrix} \hat{B}_{1,1} \\ \vdots \\ \hat{B}_{(\hat{i}-1),1} \\ \hat{B}_{\hat{i},1} \\ \hat{B}_{(\hat{i}+1),1} \\ \vdots \\ \hat{B}_{ndep,1} \end{bmatrix} \times \Delta \bar{I}_1 + \cdots + \begin{bmatrix} \hat{B}_{1,(\hat{j}-1)} \\ \vdots \\ \hat{B}_{(\hat{i}-1),(\hat{j}-1)} \\ \hat{B}_{\hat{i},(\hat{j}-1)} \\ \hat{B}_{(\hat{i}+1),(\hat{j}-1)} \\ \vdots \\ \hat{B}_{ndep,(\hat{j}-1)} \end{bmatrix} \times \Delta \bar{I}_{(\hat{j}-1)} + \begin{bmatrix} \hat{B}_{1,\hat{j}} \\ \vdots \\ \hat{B}_{(\hat{i}-1),\hat{j}} \\ \hat{B}_{\hat{i},\hat{j}} \\ \hat{B}_{(\hat{i}+1),\hat{j}} \\ \vdots \\ \hat{B}_{ndep,\hat{j}} \end{bmatrix} \times \Delta \overline{O}_{\hat{i}} +$$

$$\begin{bmatrix} \hat{B}_{1,(\hat{j}+1)} \\ \vdots \\ \hat{B}_{(\hat{i}-1),(\hat{j}+1)} \\ \hat{B}_{\hat{i},(\hat{j}+1)} \\ \hat{B}_{(\hat{i}+1),(\hat{j}+1)} \\ \vdots \\ \hat{B}_{ndep,(\hat{j}+1)} \end{bmatrix} \times \Delta \bar{I}_{(\hat{j}+1)} \cdots + \begin{bmatrix} \hat{B}_{1,nind} \\ \vdots \\ \hat{B}_{(\hat{i}-1),nind} \\ \hat{B}_{\hat{i},nind} \\ \hat{B}_{(\hat{i}+1),nind} \\ \vdots \\ \hat{B}_{ndep,nind} \end{bmatrix} \times \Delta \bar{I}_{nind} = \begin{bmatrix} I \\ \vdots \\ 0 \\ 0 \\ 0 \\ \vdots \\ 0 \end{bmatrix} \times \Delta \overline{O}_1 + \cdots +$$

$$\begin{bmatrix} 0 \\ \vdots \\ I \\ 0 \\ 0 \\ \vdots \\ 0 \end{bmatrix} \times \Delta \overline{O}_{(\hat{i}-1)} + \begin{bmatrix} 0 \\ \vdots \\ 0 \\ I \\ 0 \\ \vdots \\ 0 \end{bmatrix} \times \Delta \bar{I}_{\hat{j}} + \begin{bmatrix} 0 \\ \vdots \\ 0 \\ 0 \\ I \\ \vdots \\ 0 \end{bmatrix} \times \Delta \overline{O}_{(\hat{i}+1)} + \cdots + \begin{bmatrix} 0 \\ \vdots \\ 0 \\ 0 \\ 0 \\ \vdots \\ I \end{bmatrix} \times \Delta \overline{O}_{ndep}$$

or reassembling the matrix equation we get;

$$\begin{bmatrix} \hat{B}_{1,1} & \cdots & \hat{B}_{1,(\hat{j}-1)} & \hat{B}_{1,\hat{j}} & \hat{B}_{1,(\hat{j}+1)} & \cdots & \hat{B}_{1,nind} \\ \vdots & \ddots & \vdots & \vdots & \vdots & \ddots & \vdots \\ \hat{B}_{(\hat{i}-1),1} & \cdots & \hat{B}_{(\hat{i}-1),(\hat{j}-1)} & \hat{B}_{(\hat{i}-1),\hat{j}} & \hat{B}_{(\hat{i}-1),(\hat{j}+1)} & \cdots & \hat{B}_{(\hat{i}-1),nind} \\ \hat{B}_{\hat{i},1} & \cdots & \hat{B}_{\hat{i},(\hat{j}-1)} & \hat{B}_{\hat{i},\hat{j}} & \hat{B}_{\hat{i},(\hat{j}+1)} & \cdots & \hat{B}_{\hat{i},nind} \\ \hat{B}_{(\hat{i}+1),1} & \cdots & \hat{B}_{(\hat{i}+1),(\hat{j}-1)} & \hat{B}_{(\hat{i}+1),\hat{j}} & \hat{B}_{(\hat{i}+1),(\hat{j}+1)} & \cdots & \hat{B}_{(\hat{i}+1),nind} \\ \vdots & \ddots & \vdots & \vdots & \vdots & \ddots & \vdots \\ \hat{B}_{ndep,1} & \cdots & \hat{B}_{ndep,(\hat{j}-1)} & \hat{B}_{ndep,\hat{j}} & \hat{B}_{ndep,(\hat{j}+1)} & \cdots & \hat{B}_{ndep,nind} \end{bmatrix} \times$$

$$\begin{bmatrix} \Delta \bar{I}_1 \\ \vdots \\ \Delta \bar{I}_{(\hat{j}-1)} \\ \Delta \overline{O}_{\hat{i}} \\ \Delta \bar{I}_{(\hat{j}+1)} \\ \vdots \\ \Delta \bar{I}_{nind} \end{bmatrix} = \begin{bmatrix} I & \cdots & 0 & 0 & 0 & \cdots & 0 \\ \vdots & \ddots & \vdots & \vdots & \vdots & \ddots & \vdots \\ 0 & \ddots & I & 0 & 0 & \ddots & 0 \\ 0 & \ddots & 0 & I & 0 & \ddots & 0 \\ 0 & \ddots & 0 & 0 & I & \ddots & 0 \\ \vdots & \ddots & \vdots & \vdots & \vdots & \ddots & \vdots \\ 0 & \cdots & 0 & 0 & 0 & \cdots & I \end{bmatrix} \times \begin{bmatrix} \Delta \overline{O}_1 \\ \vdots \\ \Delta \overline{O}_{(\hat{i}-1)} \\ \Delta \bar{I}_{\hat{j}} \\ \Delta \overline{O}_{(\hat{i}+1)} \\ \vdots \\ \Delta \overline{O}_{ndep} \end{bmatrix}$$

Note that $\Delta \overline{O}_{\hat{i}}$ and $\Delta \bar{I}_{\hat{j}}$ have been interchanged so that the valve position is now an independent variable and the PID set point is now a dependent variable. This illustrates removing the PID dynamics from only one PID controller, but the algorithm is clearly general in that multiple independent/dependent variable pairs can be interchanged to remove the dynamics for multiple controllers.

By way of further illustration a numerical example problem will now be illustrated to show how this approach is applied to a model predictive controller to remove the dynamics of a particular PID controller.

Given an FIR model with two (2) independent variables, two (2) dependent variables and four (4) model coefficients, where the second independent variable is the set point of a PID controller and the second dependent variable is the valve position of the PID controller, we wish to re-constitute the model with the PID valve position as an independent variable instead of the PID set point. This requires that the dynamics of the PID controller be removed from all system responses according to the algorithm previously discussed. This example is also valid for the $\Delta O = B \Delta I_1$, $\delta O = B \delta I$, and $\Delta \Delta O = B \Delta \Delta I$ forms of the equation.

| Dependent Var-1 | |
|---|---|
| Independent Var-1 | Independent Var-2 |
| $b_{1,1,1} = 1.5$ | $b_{1,2,1} = 0.5$ |
| $b_{1,1,2} = 0.6$ | $b_{1,2,2} = 0.4$ |
| $b_{1,1,3} = 0.2$ | $b_{1,2,3} = 0.2$ |
| $b_{1,1,4} = 0.1$ | $b_{1,2,4} = 0.1$ |

| Dependent Var-2 | |
|---|---|

| Independent Var-1 | Independent Var-2 |
|---|---|
| $b_{2,1,1} = -0.3$ | $b_{2,2,1} = 0.75$ |
| $b_{2,1,2} = -0.4$ | $b_{2,2,2} = 0.25$ |
| $b_{2,1,3} = -0.1$ | $b_{2,2,3} = 0.15$ |
| $b_{2,1,4} = -0.05$ | $b_{2,2,4} = 0.05$ |

The problem is specified in the matrix below.

```
 1.5    0     0     0     0.5   0     0     0     1   0   0   0   0       0       0   0
 0.6    1.5   0     0     0.4   0.5   0     0     0   1   0   0   0       0       0   0
 0.2    0.6   1.5   0     0.2   0.4   0.5   0     0   0   1   0   0       0       0   0
 0.1    0.2   0.6   1.5   0.1   0.2   0.4   0.5   0   0   0   1   0       0       0   0

-0.3    0     0     0     0.75  0     0     0     0   0   0   0   1       0       0   0
-0.4   -0.3   0     0     0.25  0.75  0     0     0   0   0   0   0       1       0   0
-0.1   -0.4  -0.3   0     0.15  0.25  0.75  0     0   0   0   0   0       0       1   0
-0.05  -0.1  -0.4  -0.3   0.05  0.15  0.25  0.75  0   0   0   0   0       0       0   1
```
Multiply Equation-5 by (−1/0.75)

```
 1.5    0     0     0     0.5   0     0     0     1   0   0   0   0       0       0   0
 0.6    1.5   0     0     0.4   0.5   0     0     0   1   0   0   0       0       0   0
 0.2    0.6   1.50  0     0.2   0.4   0.5   0     0   0   1   0   0       0       0   0
 0.1    0.2   0.6   1.5   0.1   0.2   0.4   0.5   0   0   0   1   0       0       0   0

0.4    0     0     0    -1     0     0     0     0   0   0   0  -1.333   0       0

-0.4   -0.3   0     0     0.25  0.75  0     0     0   0   0   0   0       1       0   0
-0.1   -0.4  -0.3   0     0.15  0.25  0.75  0     0   0   0   0   0       0       1   0
-0.05  -0.1  -0.4  -0.3   0.05  0.15  0.25  0.75  0   0   0   0   0       0       0   1
```
Multiply Equation-5 by 0.5, add it to Equation-1 and replace Equation-1
Multiply Equation-5 by 0.4, add it to Equation-2 and replace Equation-2
Multiply Equation-S by 0.2, add it to Equation-3 and replace Equation-3
Multiply Equation-5 by 0.1, add it to Equation-4 and replace Equation-4
Multiply Equation-5 by 0.25, add it to Equation-6 and replace Equation-6
Multiply Equation-5 by 0.15, add it to Equation-7 and replace Equation-7
Multiply Equation-5 by 0.05, add it to Equation-8 and replace Equation-8

```
 1.7    0     0     0     0     0     0     0     1   0   0   0  -0.667   0       0   0
 0.76   1.5   0     0     0     0.5   0     0     0   1   0   0  -0.533   0       0   0
 0.28   0.6   1.5   0     0     0.4   0.5   0     0   0   1   0  -0.267   0       0   0
 0.14   0.2   0.6   1.5   0     0.2   0.4   0     0   0   0   1  -0.133   0       0   0
 0.4    0     0     0    -1     0     0     0     0   0   0   0  -1.333   0       0   0
-0.3   -0.3   0     0     0     0.75  0     0     0   0   0   0  -0.333   1       0   0
-0.04  -0.4  -0.3   0     0     0.25  0.75  0     0   0   0   0  -0.20    0       1   0
-0.03  -0.1  -0.4  -0.3   0     0.15  0.25  0.70  0   0   0   0  -0.067   0       0   1
```
Multiply Equation-6 by (−1/0.75)

```
 1.7    0     0     0     0     0     0     0     1   0   0   0  -0.667   0       0   0
 0.76   1.5   0     0     0     0.5   0     0     0   1   0   0  -0.533   0       0   0
 0.28   0.6   1.5   0     0     0.4   0.5   0     0   0   1   0  -0.267   0       0   0
 0.14   0.2   0.6   1.5   0     0.2   0.4   0.5   0   0   0   1  -0.133   0       0   0
 0.4    0     0     0    -1     0     0     0     0   0   0   0  -1.333   0       0   0

0.4    0.4   0     0     0    -1     0     0     0   0   0   0   0.444  -1.333   0   0

-0.04  -0.4  -0.3   0     0     0.25  0.75  0     0   0   0   0  -0.2     0       1   0
-0.03  -0.1  -0.4  -0.3   0     0.15  0.25  0.75  0   0   0   0  -0.067   0       0   1
```
Multiply Equation-5 by 0.5, add it to Equation-2 and replace Equation-2
Multiply Equation-5 by 0.4, add it to Equation-3 and replace Equation-3
Multiply Equation-5 by 0.2, add it to Equation-4 and replace Equation-4
Multiply Equation-5 by 0.25, add it to Equation-7 and replace Equation-7
Multiply Equation-5 by 0.15, add it to Equation-8 and replace Equation-8

```
 1.7    0     0     0     0     0     0     0     1   0   0   0  -0.667   0       0   0
 0.96   1.7   0     0     0     0     0     0     0   1   0   0  -0.311  -0.667   0   0
 0.44   0.76  1.5   0     0     0     0.5   0     0   0   1   0  -0.089  -0.533   0   0
 0.22   0.28  0.6   1.5   0     0     0.4   0.5   0   0   0   1  -0.044  -0.267   0   0
```

-continued

| | | | | | | | | | | | | | | | |
|---|---|---|---|---|---|---|---|---|---|---|---|---|---|---|---|
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 0.444 | −1.333 | 0 | 0 |
| 0.06 | −0.3 | −0.3 | 0 | 0 | 0 | 0.75 | 0 | 0 | 0 | 0 | 0 | −0.089 | −0.333 | 1 | 0 |
| 0.03 | −0.04 | −0.4 | −0.3 | 0 | 0 | 0.25 | 0.75 | 0 | 0 | 0 | 0 | 0 | −0.2 | 0 | 1 |

Multiply Equation-7 by (−1/0.75)

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 0.96 | 1.7 | 0 | 0 | 0 | 0 | 0 | 0 | 0 | 1 | 0 | 0 | −0.311 | −0.667 | 0 | 0 |
| 0.44 | 0.76 | 1.5 | 0 | 0 | 0 | 0.5 | 0 | 0 | 0 | 1 | 0 | −0.089 | −0.533 | 0 | 0 |
| 0.22 | 0.28 | 0.6 | 1.5 | 0 | 0 | 0.4 | 0.5 | 0 | 0 | 0 | 1 | −0.044 | −0.267 | 0 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | .444 | −1.333 | 0 | 0 |
| −0.08 | 0.4 | 0.4 | 0 | 0 | 0 | 0.75 | 0 | 0 | 0 | 0 | 0 | .119 | 0.4444 | −1.333 | 0 |
| 0.03 | −0.04 | −0.4 | −0.3 | 0 | 0 | 0.25 | 0.75 | 0 | 0 | 0 | 0 | 0 | −0.2 | 0 | 1 |

Multiply Equation-5 by 0.5, add it to Equation-3 and replace Equation-3
Multiply Equation-5 by 0.4, add it to Equation-4 and replace Equation-4
Multiply Equation-5 by 0.25, add it to Equation-8 and replace Equation-8

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 0.96 | 1.7 | 0 | 0 | 0 | 0 | 0 | 0 | 0 | 1 | 0 | 0 | −0.311 | −0.667 | 0 | 0 |
| 0.4 | 0.96 | 1.7 | 0 | 0 | 0 | 0 | 0 | 0 | 0 | 1 | 0 | −0.030 | −0.311 | −0.667 | 0 |
| 0.188 | 0.44 | 0.76 | 1.5 | 0 | 0 | 0 | 0.5 | 0 | 0 | 0 | 1 | 0.003 | 0.089 | −0.533 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 0.444 | −1.333 | 0 | 0 |
| −0.08 | 0.4 | 0.4 | 0 | 0 | 0 | −1 | 0 | 0 | 0 | 0 | 0 | 0.119 | 0.444 | −1.333 | 0 |
| 0.01 | 0.06 | −0.3 | −0.30 | 0 | 0 | 0 | 0.75 | 0 | 0 | 0 | 0 | 0.030 | −0.089 | −0.333 | 1 |

Multiply Equation-8 by (−1/0.75)

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 0.96 | 1.7 | 0 | 0 | 0 | 0 | 0 | 0 | 0 | 1 | 0 | 0 | −0.311 | −0.667 | 0 | 0 |
| 0.4 | 0.96 | 1.7 | 0 | 0 | 0 | 0 | 0 | 0 | 0 | 1 | 0 | −0.030 | −0.311 | −0.667 | 0 |
| 0.188 | 0.44 | 0.76 | 1.5 | 0 | 0 | 0 | 0.5 | 0 | 0 | 0 | 1 | 0.003 | −0.089 | −0.533 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 0.444 | −1.333 | 0 | 0 |
| −0.08 | 0.4 | 0.4 | 0 | 0 | 0 | −1 | 0 | 0 | 0 | 0 | 0 | 0.119 | 0.444 | −1.333 | 0 |
| −0.013 | −0.08 | 0.4 | 0.4 | 0 | 0 | 0 | 0.75 | 0 | 0 | 0 | 0 | −0.040 | 0.119 | 0.444 | −1.333 |

Multiply Equation-5 by 0.5, add it to Equation-4 and replace Equation-4

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 0.96 | 1.7 | 0 | 0 | 0 | 0 | 0 | 0 | 0 | 1 | 0 | 0 | −0.311 | −0.667 | 0 | 0 |
| 0.4 | 0.96 | 1.7 | 0 | 0 | 0 | 0 | 0 | 0 | 0 | 1 | 0 | −0.030 | −0.311 | −0.667 | 0 |
| 0.181 | 0.4 | 0.96 | 1.7 | 0 | 0 | 0 | 0 | 0 | 0 | 0 | 1 | −0.017 | −0.030 | −0.311 | −0.667 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 0.444 | −1.333 | 0 | 0 |
| −0.08 | 0.4 | 0.4 | 0 | 0 | 0 | −1 | 0 | 0 | 0 | 0 | 0 | 0.119 | 0.444 | −1.333 | 0 |
| −0.013 | −0.08 | 0.4 | 0.4 | 0 | 0 | 0 | −1 | 0 | 0 | 0 | 0 | −0.040 | 0.119 | 0.444 | −1.333 |

Rearrange Equations

| | | | | | | | | | | | | | | | |
|---|---|---|---|---|---|---|---|---|---|---|---|---|---|---|---|
| 1.7 | 0 | 0 | 0 | 0.667 | 0 | 0 | 0 | 1 | 0 | 0 | 0 | 0 | 0 | 0 | 0 |
| 0.96 | 1.7 | 0 | 0 | 0.311 | 0.667 | 0 | 0 | 0 | 1 | 0 | 0 | 0 | 0 | 0 | 0 |
| 0.4 | 0.96 | 1.7 | 0 | 0.030 | 0.311 | 0.667 | 0 | 0 | 0 | 1 | 0 | 0 | 0 | 0 | 0 |
| 0.181 | 0.4 | 0.96 | 1.7 | 0.017 | 0.030 | 0.311 | 0.667 | 0 | 0 | 0 | 1 | 0 | 0 | 0 | 0 |
| 0.4 | 0 | 0 | 0 | 1.333 | 0 | 0 | 0 | 0 | 0 | 0 | 0 | 1 | 0 | 0 | 0 |
| 0.4 | 0.4 | 0 | 0 | −0.444 | 1.333 | 0 | 0 | 0 | 0 | 0 | 0 | 0 | 1 | 0 | 0 |
| −0.08 | 0.4 | 0.4 | 0 | −0.119 | −0.444 | 1.333 | 0 | 0 | 0 | 0 | 0 | 0 | 0 | 1 | 0 |

The new model coefficients with the PID dynamics removed are as follows:

Dependent Var-1

| Independent Var-1 | Independent Var-2 |
|---|---|
| $\hat{b}_{1,1,1} = 1.7$ | $\hat{b}_{1,2,1} = 0.667$ |
| $\hat{b}_{1,1,2} = 0.96$ | $\hat{b}_{1,2,2} = 0.311$ |
| $\hat{b}_{1,1,3} = 0.4$ | $\hat{b}_{1,2,3} = 0.030$ |
| $\hat{b}_{1,1,4} = 0.181$ | $\hat{b}_{1,2,4} = 0.017$ |

| Dependent Var-2 | |
| --- | --- |
| Independent Var-1 | Independent Var-2 |
| $\hat{b}_{2,1,1} = 0.4$ | $\hat{b}_{2,2,1} = 1.333$ |
| $\hat{b}_{2,1,2} = 0.4$ | $\hat{b}_{2,2,2} = -0.444$ |
| $\hat{b}_{2,1,3} = -0.08$ | $\hat{b}_{2,2,3} = -0.119$ |
| $\hat{b}_{2,1,4} = -0.0133$ | $\hat{b}_{2,2,4} = 0.040$ |

Note that all the coefficient values changed. This new controller now has the dynamics of the second independent variable (a PID set point) removed. This controller can now be used to control the process and the development of this controller was done off line without having to do an additional time consuming expensive identification test on the process.

Algorithm to Remove PID Dynamics, Open-Loop Step Response Form

In the derivation and example, we discussed the algorithm to remove PID dynamics from an FIR model based on the impulse, or derivative, form of the equations. A similar algorithm can be derived for the Step coefficient form of the model, $\delta O = A \Delta I$, as well, as we will now illustrate with a 2 independent, 2 dependent variable example problem. For purposes of this example, we will assume that the second independent and second dependents are to be exchanged. The problem can be written in matrix notation as:

$$\begin{bmatrix} A_{1,1} & A_{1,2} \\ A_{2,1} & A_{2,2} \end{bmatrix} \times \begin{bmatrix} \Delta \bar{I}_1 \\ \Delta \bar{I}_2 \end{bmatrix} = \begin{bmatrix} I0 \\ 0I \end{bmatrix} \times \begin{bmatrix} \delta \overline{O}_1 \\ \delta \overline{O}_2 \end{bmatrix}$$

We perform elimination operations (pivoting) to get:

$$\begin{bmatrix} \hat{A}_{1,1} & 0 \\ \hat{B}_{2,1} & -I \end{bmatrix} \times \begin{bmatrix} \Delta \bar{I}_1 \\ \Delta \bar{I}_2 \end{bmatrix} = \begin{bmatrix} I - \hat{B}_{1,2} \\ 0 - \hat{C}_{2,2} \end{bmatrix} \times \begin{bmatrix} \delta \overline{O}_1 \\ \delta \overline{O}_2 \end{bmatrix}$$

Rearranging, we get:

$$\begin{bmatrix} \hat{A}_{1,1} & \hat{B}_{1,2} \\ \hat{B}_{2,1} & \hat{C}_{2,2} \end{bmatrix} \times \begin{bmatrix} \Delta \bar{I}_1 \\ \delta \overline{O}_2 \end{bmatrix} = \begin{bmatrix} I0 \\ 0I \end{bmatrix} \times \begin{bmatrix} \delta \overline{O}_1 \\ \Delta \bar{I}_2 \end{bmatrix}$$

Which can be written as:

$$\hat{A}_{1,1} \Delta \bar{I}_1 + \hat{B}_{1,2} \delta \overline{O}_2 = \delta \overline{O}_1$$

$$\hat{B}_{2,1} \Delta \bar{I}_1 + \hat{C}_{2,2} \delta \overline{O}_2 = \Delta \bar{I}_2$$

Recall that the Impulse coefficients are defined as:

$b_{i,j,k} = a_{i,j,k}$ for k=1

$b_{i,j,k} = a_{i,j,k} - a_{i,j,(k-1)} = \Delta a_{i,j,k}$ for $k:2 \rightarrow ncoef$ Likewise, we define the second difference coefficients as:

$c_{i,j,k} = b_{i,j,k}$ for k=1

$c_{i,j,k} = b_{i,j,k} - b_{i,j,(k-1)} = \Delta b_{i,j,k}$ for $k:2 \rightarrow ncoef$ Note that:

$$b_{i,j,m} = \sum_{m=1}^{l} (c_{i,j,l})$$

$$a_{i,j,k} = \sum_{l=1}^{k} (b_{i,j,l}) = \sum_{l}^{k} \left( \sum_{m=1}^{l} (c_{i,j,m}) \right)$$

Note that the matrix is now a mixed bag of Step response coefficients (A), Impulse coefficients (B), and $2^{nd}$ difference coefficients (C). This is due to the fact that our new independent variable is in the "accumulative" form instead of the "delta" form and the new dependent variable is in the "delta" form instead of the "accumulative" form. To convert this system of equation to the Step form and thereby recover the Step coefficients, two steps must be performed:

Step-1: Convert new independent variable from "accumulative" to "delta" form, $\delta \overline{O}_2 \Rightarrow \Delta \overline{O}_2$, Step-2: Convert new dependent variable from "delta" to "accumulative" form, $\Delta \bar{I}_2 \Rightarrow \delta \bar{I}_2$.

Step-1: Convert new independent variable from "accumulative" to "delta" form.

This step requires only a rearrangement of terms in the equations. Note that, $\delta \overline{O}_2$ appears in two sections of the matrix:

$$\begin{bmatrix} \hat{B}_{1,2} \delta \overline{O}_2 \\ \hat{C}_{2,2} \delta \overline{O}_2 \end{bmatrix} =$$

$$\begin{bmatrix} \hat{b}_{1,2,1}(O_{2,1} - O_{2,0}) \\ \hat{b}_{1,2,2}(O_{2,1} - O_{2,0}) + \hat{b}_{1,2,1}(O_{2,2} - O_{2,0}) \\ \hat{b}_{1,2,3}(O_{2,1} - O_{2,0}) + \hat{b}_{1,2,2}(O_{2,2} - O_{2,0}) + \hat{b}_{1,2,1}(O_{2,3} - O_{2,0}) \\ \vdots \quad \vdots \quad \vdots \quad \ddots \\ \hat{c}_{2,2,1}(O_{2,1} - O_{2,0}) \\ \hat{c}_{2,2,2}(O_{2,1} - O_{2,0}) + \hat{c}_{2,2,1}(O_{2,2} - O_{2,0}) \\ \hat{c}_{2,2,3}(O_{2,1} - O_{2,0}) + \hat{c}_{2,2,2}(O_{2,2} - O_{2,0}) + \hat{c}_{2,2,1}(O_{2,3} - O_{2,0}) \\ \vdots \quad \vdots \quad \vdots \quad \ddots \end{bmatrix}$$

Since $b_{i,j,k} = a_{i,j,k}$ for k=1

$b_{i,j,k} = a_{i,j,k} - a_{i,j,(k-1)} = \Delta a_{i,j,k}$ for $k:2 \rightarrow ncoef$ and $c_{i,j,k} = b_{i,j,k}$ for k=1

$c_{i,j,k} = b_{i,j,k} - b_{i,j,(k-1)} = \Delta b_{i,j,k}$ for $k:2 \rightarrow ncoef$ we can write the above as:

$$\begin{bmatrix} \hat{B}_{1,2}\delta\overline{O}_2 \\ \hat{C}_{2,2}\delta\overline{O}_2 \end{bmatrix} = \begin{bmatrix} \hat{a}_{1,2,1}(O_{2,1} - O_{2,0}) \\ (\hat{a}_{1,2,2} - \hat{a}_{1,2,1})(O_{2,1} - O_{2,0}) + \hat{a}_{1,2,1}(O_{2,2} - O_{2,0}) \\ (\hat{a}_{1,2,3} - \hat{a}_{1,2,2})(O_{2,1} - O_{2,0}) + (\hat{a}_{1,2,2} - \hat{a}_{1,2,1})(O_{2,2} - O_{2,0}) + a_{1,2,1}(O_{2,3} - O_{2,0}) \\ \vdots \quad \vdots \quad \vdots \quad \ddots \\ \hat{b}_{2,2,1}(O_{2,1} - O_{2,0}) \\ (\hat{b}_{2,2,2} - \hat{b}_{2,2,1})(O_{2,1} - O_{2,0}) + \hat{b}_{2,2,1}(O_{2,2} - O_{2,0}) \\ (\hat{b}_{2,2,3} - \hat{b}_{2,2,2})(O_{2,1} - O_{2,0}) + (\hat{b}_{2,2,2} - \hat{b}_{2,2,1})(O_{2,2} - O_{2,0}) + \hat{b}_{2,2,1}(O_{2,3} - O_{2,0}) \\ \vdots \quad \vdots \quad \vdots \quad \ddots \end{bmatrix}$$

$$= \begin{bmatrix} \hat{a}_{1,2,1}(O_{2,1} - O_{2,0}) \\ \hat{a}_{1,2,2}O_{2,1} - \hat{a}_{1,2,2}O_{2,0} - \hat{a}_{1,2,1}O_{2,1} + \hat{a}_{1,2,1}O_{2,0} + \hat{a}_{1,2,1}O_{2,2} - \hat{a}_{1,2,1}O_{2,0} \\ \hat{a}_{1,2,3}O_{2,1} - \hat{a}_{1,2,3}O_{2,0} - \hat{a}_{1,2,2}O_{2,1} + \hat{a}_{1,2,2}O_{2,0} + \hat{a}_{1,2,2}O_{2,2} - \hat{a}_{1,2,2}O_{2,0} - \hat{a}_{1,2,1}O_{2,2} + \hat{a}_{1,2,1}O_{2,0} + \hat{a}_{1,2,1}O_{2,3} - \hat{a}_{1,2,1}O_{2,0} \\ \vdots \\ \hat{b}_{2,2,1}(O_{2,1} - O_{2,0}) \\ \hat{b}_{2,2,2}O_{2,1} - \hat{b}_{2,2,2}O_{2,0} - \hat{b}_{2,2,1}O_{2,1} + \hat{b}_{2,2,1}O_{2,0} + \hat{b}_{2,2,1}O_{2,2} - \hat{b}_{2,2,1}O_{2,0} \\ \hat{b}_{2,2,3}O_{2,1} - \hat{b}_{2,2,3}O_{2,0} - \hat{b}_{2,2,2}O_{2,1} + \hat{b}_{2,2,2}O_{2,0} + \hat{b}_{2,2,2}O_{2,2} - \hat{b}_{2,2,2}O_{2,0} - \hat{b}_{2,2,1}O_{2,2} + \hat{b}_{2,2,1}O_{2,0} + \hat{b}_{2,2,1}O_{2,3} - \hat{b}_{2,2,1}O_{2,0} \\ \vdots \end{bmatrix}$$

$$= \begin{bmatrix} \hat{a}_{1,2,1}(O_{2,1} - O_{2,0}) \\ \hat{a}_{1,2,2}(O_{2,1} - O_{2,0}) + \hat{a}_{1,2,1}(O_{2,2} - O_{2,1} + O_{2,0} - O_{2,0}) \\ \hat{a}_{1,2,3}(O_{2,1} - O_{2,0}) + \hat{a}_{1,2,2}(O_{2,2} - O_{2,1} + O_{2,0} - O_{2,0}) + \hat{a}_{1,2,1}(O_{2,3} - O_{2,2} + O_{2,0} - O_{2,0}) \\ \vdots \\ \hat{b}_{2,2,1}(O_{2,1} - O_{2,0}) \\ \hat{b}_{2,2,2}(O_{2,1} - O_{2,0}) + \hat{b}_{2,2,1}(O_{2,2} - O_{2,1} + O_{2,0} - O_{2,0}) \\ \hat{b}_{2,2,3}(O_{2,1} - O_{2,0}) + \hat{b}_{2,2,2}(O_{2,2} - O_{2,1} + O_{2,0} - O_{2,0}) + \hat{b}_{2,2,1}(O_{2,3} - O_{2,2} + O_{2,0} - O_{2,0}) \\ \vdots \end{bmatrix}$$

$$= \begin{bmatrix} \hat{a}_{1,2,1}(O_{2,1} - O_{2,0}) \\ \hat{a}_{1,2,2}(O_{2,1} - O_{2,0}) + \hat{a}_{1,2,1}(O_{2,2} - O_{2,1}) \\ \hat{a}_{1,2,3}(O_{2,1} - O_{2,0}) + \hat{a}_{1,2,2}(O_{2,2} - O_{2,1}) + \hat{a}_{1,2,1}(O_{2,3} - O_{2,2}) \\ \vdots \quad \vdots \quad \vdots \quad \ddots \\ \hat{b}_{2,2,1}(O_{2,1} - O_{2,0}) \\ \hat{b}_{2,2,1}(O_{2,1} - O_{2,0}) + \hat{b}_{2,2,1}(O_{2,2} - O_{2,1}) \\ \hat{b}_{2,2,3}(O_{2,1} - O_{2,0}) + \hat{b}_{2,2,2}(O_{2,2} - O_{2,1}) + \hat{b}_{2,2,1}(O_{2,3} - O_{2,2}) \\ \vdots \quad \vdots \quad \vdots \quad \ddots \end{bmatrix}$$

$$= \begin{bmatrix} \hat{a}_{1,2,1}\Delta O_{2,1} \\ \hat{a}_{1,2,2}\Delta O_{2,1} + \hat{a}_{1,2,1}\Delta O_{2,2} \\ \hat{a}_{1,2,3}\Delta O_{2,1} + \hat{a}_{1,2,2}\Delta O_{2,2} + \hat{a}_{1,2,1}\Delta O_{2,3} \\ \vdots \quad \vdots \quad \vdots \quad \ddots \\ \hat{b}_{2,2,1}\Delta O_{2,1} \\ \hat{b}_{2,2,2}\Delta O_{2,1} + \hat{b}_{2,2,1}\Delta O_{2,2} \\ \hat{b}_{2,2,3}\Delta O_{2,1} + \hat{b}_{2,2,2}\Delta O_{2,2} + \hat{b}_{2,2,1}\Delta O_{2,3} \\ \vdots \quad \vdots \quad \vdots \quad \ddots \end{bmatrix} = \begin{bmatrix} \hat{A}_{1,2}\Delta\overline{O}_2 \\ \hat{B}_{2,2}\Delta\overline{O}_2 \end{bmatrix}$$

Since $$\begin{bmatrix} \hat{B}_{1,2}\delta\overline{O}_2 \\ \hat{C}_{2,2}\delta\overline{O}_2 \end{bmatrix} = \begin{bmatrix} \hat{A}_{1,2}\Delta\overline{O}_2 \\ \hat{B}_{2,2}\Delta\overline{O}_2 \end{bmatrix},$$

we can re-write the system of equations as:

$$\hat{A}_{1,1}\Delta\overline{I}_1 + \hat{A}_{1,2}\Delta\overline{O}_2 = \delta\overline{O}_1$$

$$\hat{B}_{2,1}\Delta\overline{I}_1 + \hat{B}_{2,2}\Delta\overline{O}_2 = \Delta\overline{I}_2$$

This completes Step-1.

Step-2: Convert new dependent variable from "delta" to "accumulative" form.

The equations for the new second dependent variable are written below. It is necessary to accumulate these equations to convert from the "delta" to the "accumulative" form.

$$\hat{b}_{2,1,1}\Delta I_{1,1} \qquad + \hat{b}_{2,2,1}\Delta O_{2,1} \qquad = I_{2,1} - I_{2,0} = \Delta I_{2,1}$$

$$\hat{b}_{2,1,2}\Delta I_{1,1} + \hat{b}_{2,1,1}\Delta I_{1,2} \qquad + \hat{b}_{2,2,2}\Delta O_{2,1} + \hat{b}_{2,2,1}\Delta O_{2,2} \qquad = I_{2,2} - I_{2,1} = \Delta I_{2,2}$$

$$\hat{b}_{2,1,3}\Delta I_{1,1} + \hat{b}_{2,1,2}\Delta I_{1,2} + \hat{b}_{2,1,1}\Delta I_{1,3} \qquad + \hat{b}_{2,2,3}\Delta O_{2,1} + \hat{b}_{2,2,2}\Delta O_{2,2} + \hat{b}_{2,2,1}\Delta O_{2,3} \qquad = I_{2,3} - I_{2,2} = \Delta I_{2,3}$$

$$\hat{b}_{2,1,4}\Delta I_{1,1} + \hat{b}_{2,1,3}\Delta I_{1,2} + \hat{b}_{2,1,2}\Delta I_{1,3} + \hat{b}_{2,1,1}\Delta I_{1,4} + \hat{b}_{2,2,4}\Delta O_{2,1} + \hat{b}_{2,2,3}\Delta O_{2,2} + \hat{b}_{2,2,2}\Delta O_{2,3} + \hat{b}_{2,2,1}\Delta O_{2,4} = I_{2,4} - I_{2,3} = \Delta I_{2,4}$$

$$\vdots \qquad \vdots \qquad \vdots \qquad \vdots \qquad \vdots \qquad \vdots \qquad \vdots \qquad \vdots \qquad \vdots$$

Since by definition, $b_{i,j,1} = a_{i,j,1}$, and $I_{j,1} - I_{j,0} = \Delta I_{j,1} = \delta I_{j,1}$, the first equation becomes:

$$\hat{a}_{2,1,1}\Delta I_{1,1} + \hat{a}_{2,2,1}\Delta O_{2,1} = \delta I_{2,1}$$

To obtain the second Step coefficient equation, add together the first two Impulse coefficient equations:

$$(\hat{b}_{2,1,1} + \hat{b}_{2,1,2})\Delta I_{1,1} + \hat{b}_{2,1,1}\Delta I_{1,2} + (\hat{b}_{2,2,1} + \hat{b}_{2,2,2})\Delta O_{2,1} + \hat{b}_{2,2,1}\Delta O_{2,2} = I_{2,2} - I_{2,1} + I_{2,1} - I_{2,0} = I_{2,2} - I_{2,0}$$

or, $$\hat{a}_{2,1,2}\Delta I_{1,1} + \hat{a}_{2,1,1}\Delta I_{1,2} + \hat{a}_{2,2,2}\Delta O_{2,1} + \hat{a}_{2,2,1}\Delta O_{2,2} = \delta I_{2,2}$$

To obtain the third Step coefficient equation, add together the first three Impulse coefficient equations:

$$(\hat{b}_{2,1,1} + \hat{b}_{2,1,2} + \hat{b}_{2,1,3})\Delta I_{1,1} + (\hat{b}_{2,1,1} + \hat{b}_{2,1,2})\Delta I_{1,2} + \hat{b}_{2,1,1}\Delta I_{1,3} +$$

$$(\hat{b}_{2,2,1} + \hat{b}_{2,2,2} + \hat{b}_{2,2,3})\Delta O_{2,1} + (\hat{b}_{2,2,1} + \hat{b}_{2,2,2})\Delta O_{2,2} + \hat{b}_{2,2,1}\Delta O_{2,3} =$$

$$I_{2,3} - I_{2,2} + I_{2,2} - I_{2,1} + I_{2,1} - I_{2,0} = I_{2,3} - I_{2,0}$$

or, $$\hat{a}_{2,1,3}\Delta I_{1,1} + \hat{a}_{2,1,2}\Delta I_{1,2} + \hat{a}_{2,1,1}\Delta I_{1,3} + \hat{a}_{2,2,3}\Delta O_{2,1} + \hat{a}_{2,2,2}\Delta O_{2,2} + \hat{a}_{2,2,1}\Delta O_{2,3} = \delta I_{2,3}$$

To obtain the fourth Step coefficient equation, add together the first four Impulse coefficient equations:

$$(\hat{b}_{2,1,1} + \hat{b}_{2,1,2} + \hat{b}_{2,1,3} + \hat{b}_{2,1,4})\Delta I_{1,1} +$$

$$(\hat{b}_{2,1,1} + \hat{b}_{2,1,2}\hat{b}_{2,1,3})\Delta I_{1,2} + (\hat{b}_{2,1,1} + \hat{b}_{2,1,2})\Delta I_{1,3} +$$

-continued $$\hat{b}_{2,1,1}\Delta I_{1,4} + (\hat{b}_{2,2,1} + \hat{b}_{2,2,2} + \hat{b}_{2,2,3} + \hat{b}_{2,2,4})\Delta O_{2,1} +$$

$$(\hat{b}_{2,2,1} + \hat{b}_{2,2,2} + \hat{b}_{2,2,3})\Delta O_{2,2} + (\hat{b}_{2,2,1} + \hat{b}_{2,2,2})\Delta O_{2,3} +$$

$$\hat{b}_{2,2,1}\Delta O_{2,4} = I_{2,4} - I_{2,3} + I_{2,3} - I_{2,2} + I_{2,2} - I_{2,1} - I_{2,0} =$$

$$I_{2,4} - I_{2,0}$$

or, $$\hat{a}_{2,1,4}\Delta I_{1,1} + \hat{a}_{2,1,3}\Delta I_{1,2} + \hat{a}_{2,1,2}\Delta I_{1,3} + \hat{a}_{2,1,1}\Delta I_{1,4} + \hat{a}_{2,2,4}\Delta O_{2,1} + \hat{a}_{2,2,3}\Delta O_{2,2} + \hat{a}_{2,2,2}\Delta O_{2,3} + \hat{a}_{2,2,1}\Delta O_{2,4} = \delta I_{2,4}$$

So the system of equations for the new $2^{nd}$ dependent variable now becomes:

$$\hat{a}_{2,1,1}\Delta I_{1,1} \qquad + \hat{a}_{2,2,1}\Delta O_{2,1} \qquad = I_{2,1} - I_{2,0} = \delta I_{2,1}$$

$$\hat{a}_{2,1,2}\Delta I_{1,1} + \hat{a}_{2,1,1}\Delta I_{1,2} \qquad + \hat{a}_{2,2,2}\Delta O_{2,1} + \hat{a}_{2,2,1}\Delta O_{2,2} \qquad = I_{2,2} - I_{2,0} = \delta I_{2,2}$$

$$\hat{a}_{2,1,3}\Delta I_{1,1} + \hat{a}_{2,1,2}\Delta I_{1,2} + \hat{a}_{2,1,1}\Delta I_{1,3} \qquad + \hat{a}_{2,2,3}\Delta O_{2,1} + \hat{a}_{2,2,2}\Delta O_{2,2} + \hat{a}_{2,2,1}\Delta O_{2,3} \qquad = I_{2,3} - I_{2,0} = \delta I_{2,3}$$

$$\hat{a}_{2,1,4}\Delta I_{1,1} + \hat{a}_{2,1,3}\Delta I_{1,2} + \hat{a}_{2,1,2}\Delta I_{1,3} + \hat{a}_{2,1,1}\Delta I_{1,4} + \hat{a}_{2,2,4}\Delta O_{2,1} + \hat{a}_{2,2,3}\Delta O_{2,2} + \hat{a}_{2,2,2}\Delta O_{2,3} + \hat{a}_{2,2,1}\Delta O_{2,4} = I_{2,4} - I_{2,0} = \delta I_{2,4}$$

$$\vdots \qquad \vdots \qquad \vdots \qquad \vdots \qquad \vdots \qquad \vdots \qquad \vdots \qquad \vdots \qquad \vdots$$

And the overall system of equations becomes:

$$\begin{array}{|llll|llll|l}
\hat{a}_{1,1,1}\Delta I_{1,1} & & & & +\hat{a}_{1,2,1}\Delta O_{2,1} & & & & = \delta O_{1,1} \\
\hat{a}_{1,1,2}\Delta I_{1,1} & +\hat{a}_{1,1,1}\Delta I_{1,2} & & & +\hat{a}_{1,2,2}\Delta O_{2,1} & +\hat{a}_{1,2,1}\Delta O_{2,2} & & & = \delta O_{1,2} \\
\hat{a}_{1,1,3}\Delta I_{1,1} & +\hat{a}_{1,1,2}\Delta I_{1,2} & +\hat{a}_{1,1,1}\Delta I_{1,3} & & +\hat{a}_{1,2,3}\Delta O_{2,1} & +\hat{a}_{1,2,2}\Delta O_{2,2} & +\hat{a}_{1,2,1}\Delta O_{2,3} & & = \delta O_{1,3} \\
\vdots & \vdots & \vdots & \ddots & \vdots & \vdots & \vdots & \ddots & \vdots \\
\hat{a}_{1,1,ncoef}\Delta I_{1,1} & \cdots & \cdots & \cdots +\hat{a}_{1,1,1}\Delta I_{1,ncoef} & +\hat{a}_{1,2,ncoef}\Delta O_{2,1} & \cdots & \cdots & \cdots +\hat{a}_{1,2,1}\Delta O_{2,ncoef} & = \delta O_{1,ncoef} \\
\hat{a}_{2,1,1}\Delta I_{1,1} & & & & +\hat{a}_{2,21}\Delta O_{2,1} & & & & = \delta I_{2,1} \\
\hat{a}_{2,1,2}\Delta I_{1,1} & +\hat{a}_{2,1,1}\Delta I_{1,2} & & & +\hat{a}_{2,2,2}\Delta O_{2,1} & +\hat{a}_{2,2,1}\Delta O_{2,2} & & & = \delta I_{2,2} \\
\hat{a}_{2,1,3}\Delta I_{1,1} & +\hat{a}_{2,1,2}\Delta I_{1,2} & +\hat{a}_{2,1,1}\Delta I_{1,3} & & +\hat{a}_{2,2,3}\Delta O_{2,1} & +\hat{a}_{2,2,2}\Delta O_{2,2} & +\hat{a}_{2,2,1}\Delta O_{2,3} & & = \delta I_{2,3} \\
\vdots & \vdots & \vdots & \ddots & \vdots & \vdots & \vdots & \ddots & \vdots \\
\hat{a}_{2,1,ncoef}\Delta I_{1,1} & \cdots & \cdots & \cdots +\hat{a}_{2,1,1}\Delta I_{ncoef} & +\hat{a}_{2,2ncoef}\Delta O_{2,1} & \cdots & \cdots & \cdots +\hat{a}_{2,21}\Delta I_{1,ncoef} & = \delta I_{2,ncoef}
\end{array}$$

which can be re-written as:

$$\hat{A}_{1,1}\Delta \bar{I}_1 + \hat{A}_{1,2}\Delta \bar{O}_2 = \delta \bar{O}_1$$

$$\hat{A}_{2,1}\Delta \bar{I}_1 + \hat{A}_{2,2}\Delta \bar{O}_2 = \delta \bar{I}_2$$

To further illustrate the application of this invention another numerical example is given to demonstrate the use of the algorithm just derived for the open-loop step response model. This algorithm is applied to equations of the form $\delta O = A\Delta I$. Given a model with two (2) independent variables, two (2) dependent variables and four (4) model coefficients, where the second independent variable is the set point of a PID controller and the second dependent variable is the valve position of the PID controller, we wish to re-constitute the model with the PID valve position as an independent variable instead of the PID set point. This requires that the dynamics of the PID controller be removed from all system responses according to the algorithm previously discussed. The underlying model in this example is the same as that used in Appendix-2.

| Dependent Var-1 | |
|---|---|
| Independent Var-1 | Independent Var-2 |
| $a_{1,1,1} = 1.5$ | $a_{1,2,1} = 0.5$ |
| $a_{1,1,2} = 2.1$ | $a_{1,2,2} = 0.9$ |
| $a_{1,1,3} = 2.3$ | $a_{1,2,3} = 1.1$ |
| $a_{1,1,4} = 2.4$ | $a_{1,2,4} = 1.2$ |

| Dependent Var-2 | |
|---|---|
| Independent Var-1 | Independent Var-2 |
| $a_{2,1,1} = -0.3$ | $a_{2,2,1} = 0.75$ |
| $a_{2,1,2} = -0.7$ | $a_{2,2,2} = 1.0$ |
| $a_{2,1,3} = -0.8$ | $a_{2,2,3} = 1.15$ |
| $a_{2,1,4} = -0.85$ | $a_{2,2,4} = 1.2$ |

The problem is specified in the matrix below.

| 1.5 | 0 | 0 | 0 | 0.5 | 0 | 0 | 0 | 1 | 0 | 0 | 0 | 0 | 0 | 0 | 0 |
|---|---|---|---|---|---|---|---|---|---|---|---|---|---|---|---|
| 2.1 | 1.5 | 0 | 0 | 0.9 | 0.5 | 0 | 0 | 0 | 1 | 0 | 0 | 0 | 0 | 0 | 0 |
| 2.3 | 2.1 | 1.5 | 0 | 1.1 | 0.9 | 0.5 | 0 | 0 | 0 | 1 | 0 | 0 | 0 | 0 | 0 |
| 2.4 | 2.3 | 2.1 | 1.5 | 1.2 | 1.1 | 0.9 | 0.5 | 0 | 0 | 0 | 1 | 0 | 0 | 0 | 0 |
| -0.3 | 0 | 0 | 0 | 0.75 | 0 | 0 | 0 | 0 | 0 | 0 | 0 | 1 | 0 | 0 | 0 |
| -0.7 | -0.3 | 0 | 0 | 1 | 0.75 | 0 | 0 | 0 | 0 | 0 | 0 | 0 | 1 | 0 | 0 |
| -0.8 | -0.7 | -0.3 | 0 | 1.15 | 1 | 0.75 | 0 | 0 | 0 | 0 | 0 | 0 | 0 | 1 | 0 |
| -0.85 | -0.8 | -0.7 | -0.3 | 1.2 | 1.15 | 1 | 0.75 | 0 | 0 | 0 | 0 | 0 | 0 | 0 | 1 |

Multiply Equation-5 by (−1/0.75)

| 1.5 | 0 | 0 | 0 | 0.5 | 0 | 0 | 0 | 1 | 0 | 0 | 0 | 0 | 0 | 0 | 0 |
|---|---|---|---|---|---|---|---|---|---|---|---|---|---|---|---|
| 2.1 | 1.5 | 0 | 0 | 0.9 | 0.5 | 0 | 0 | 0 | 1 | 0 | 0 | 0 | 0 | 0 | 0 |
| 2.3 | 2.1 | 1.5 | 0 | 1.1 | 0.9 | 0.5 | 0 | 0 | 0 | 1 | 0 | 0 | 0 | 0 | 0 |
| 2.4 | 2.3 | 2.1 | 1.5 | 1.2 | 1.1 | 0.9 | 0.5 | 0 | 0 | 0 | 1 | 0 | 0 | 0 | 0 |
| 0.4 | 0 | 0 | 0 | −1 | 0 | 0 | 0 | 0 | 0 | 0 | 0 | −1.333 | 0 | 0 | 0 |
| -0.7 | -0.3 | 0 | 0 | 1 | 0.75 | 0 | 0 | 0 | 0 | 0 | 0 | 0 | 1 | 0 | 0 |
| -0.8 | -0.7 | -0.3 | 0 | 1.15 | 1 | 0.75 | 0 | 0 | 0 | 0 | 0 | 0 | 0 | 1 | 0 |
| -0.85 | -0.8 | -0.7 | -0.3 | 1.2 | 1.15 | 1 | 0.75 | 0 | 0 | 0 | 0 | 0 | 0 | 0 | 1 |

-continued

Multiply Equation-5 by 0.5, add it to Equation-1 and replace Equation-1
Multiply Equation-5 by 0.9, add it to Equation-2 and replace Equation-2
Multiply Equation-5 by 1.1, add it to Equation-3 and replace Equation-3
Multiply Equation-5 by 1.2, add it to Equation-4 and replace Equation-4
Multiply Equation-5 by 1.0, add it to Equation-6 and replace Equation-6
Multiply Equation-5 by 1.15, add it to Equation-7 and replace Equation-7
Multiply Equation-5 by 1.2, add it to Equation-8 and replace Equation-8

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 2.46 | 1.5 | 0 | 0 | 0 | 0.5 | 0 | 0 | 0 | 1 | 0 | 0 | −1.200 | 0 | 0 | 0 |
| 2.74 | 2.1 | 1.5 | 0 | 0 | 0.9 | 0.5 | 0 | 0 | 0 | 1 | 0 | −1.467 | 0 | 0 | 0 |
| 2.88 | 2.3 | 2.1 | 1.5 | 0 | 1.1 | 0.9 | 0.5 | 0 | 0 | 0 | 1 | −1.600 | 0 | 0 | 0 |
| 0.4 | 0 | 0 | 0 | −1 | 0 | 0 | 0 | 0 | 0 | 0 | 0 | −1.333 | 0 | 0 | 0 |
| −0.3 | −0.3 | 0 | 0 | 0 | 0.75 | 0 | 0 | 0 | 0 | 0 | 0 | −1.333 | 1 | 0 | 0 |
| −0.34 | −0.7 | −0.3 | 0 | 0 | 1 | 0.75 | 0 | 0 | 0 | 0 | 0 | −1.5 | 0 | 1 | 0 |
| −0.37 | −0.8 | −0.7 | −0.3 | 0 | 1.15 | 1 | 0.75 | 0 | 0 | 0 | 0 | −1.600 | 0 | 0 | 1 |

Multiply Equation-6 by (−1/0.75)

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 2.46 | 1.5 | 0 | 0 | 0 | 0.5 | 0 | 0 | 0 | 1 | 0 | 0 | −1.200 | 0 | 0 | 0 |
| 2.74 | 2.1 | 1.5 | 0 | 0 | 0.9 | 0.5 | 0 | 0 | 0 | 1 | 0 | −1.467 | 0 | 0 | 0 |
| 2.88 | 2.3 | 2.1 | 1.5 | 0 | 1.1 | 0.9 | 0.5 | 0 | 0 | 0 | 1 | −1.600 | 0 | 0 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 1.778 | −1.333 | 0 | 0 |
| −0.34 | −0.7 | −0.3 | 0 | 0 | 1 | 0.75 | 0 | 0 | 0 | 0 | 0 | −1.533 | 0 | 1 | 0 |
| −0.37 | −0.8 | −0.7 | −0.3 | 0 | 1.15 | 1 | 0.75 | 0 | 0 | 0 | 0 | −1.600 | 0 | 0 | 1 |

Multiply Equation-5 by 0.5, add it to Equation-2 and replace Equation-2
Multiply Equation-5 by 0.9, add it to Equation-3 and replace Equation-3
Multiply Equation-5 by 1.1, add it to Equation-4 and replace Equation-4
Multiply Equation-5 by 1.0, add it to Equation-7 and replace Equation-7
Multiply Equation-5 by 1.15, add it to Equation-8 and replace Equation-8

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 2.66 | 1.7 | 0 | 0 | 0 | 0 | 0 | 0 | 0 | 1 | 0 | 0 | −0.311 | −0.667 | 0 | 0 |
| 3.1 | 2.46 | 1.5 | 0 | 0 | 0.5 | 0 | 0 | 0 | 0 | 1 | 0 | 0.133 | −1.200 | 0 | 0 |
| 3.32 | 2.74 | 2.1 | 1.5 | 0 | 0.9 | 0.5 | 0 | 0 | 0 | 0 | 1 | 0.356 | −1.467 | 0 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 1.778 | −1.333 | 0 | 0 |
| 0.06 | −0.3 | −0.3 | 0 | 0 | 0 | 0.75 | 0 | 0 | 0 | 0 | 0 | 0.244 | −1.333 | 1 | 0 |
| 0.09 | −0.34 | −0.7 | −0.3 | 0 | 0 | 1 | 0.75 | 0 | 0 | 0 | 0 | 0.444 | −1.533 | 0 | 1 |

Multiply Equation-7 by (−1/0.75)

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 2.66 | 1.7 | 0 | 0 | 0 | 0 | 0 | 0 | 0 | 1 | 0 | 0 | −0.311 | −0.667 | 0 | 0 |
| 3.1 | 2.46 | 1.5 | 0 | 0 | 0.5 | 0 | 0 | 0 | 0 | 1 | 0 | 0.133 | −1.200 | 0 | 0 |
| 3.32 | 2.74 | 2.1 | 1.5 | 0 | 0.9 | 0.5 | 0 | 0 | 0 | 0 | 1 | 0.356 | −1.467 | 0 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 1.778 | −1.333 | 0 | 0 |
| −0.08 | 0.4 | 0.4 | 0 | 0 | 0 | −1 | 0 | 0 | 0 | 0 | 0 | −0.326 | 1.778 | −1.333 | 0 |
| 0.09 | −0.34 | −0.7 | −0.3 | 0 | 0 | 1 | 0.75 | 0 | 0 | 0 | 0 | 0.444 | −1.533 | 0 | 1 |

Multiply Equation-5 by 0.5, add it to Equation-3 and replace Equation-3
Multiply Equation-5 by 0.9, add it to Equation-4 and replace Equation-4
Multiply Equation-5 by 1.0, add it to Equation-8 and replace Equation-8

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 2.66 | 1.7 | 0 | 0 | 0 | 0 | 0 | 0 | 0 | 1 | 0 | 0 | −0.311 | −0.667 | 0 | 0 |
| 3.06 | 2.66 | 1.7 | 0 | 0 | 0 | 0 | 0 | 0 | 0 | 1 | 0 | −0.030 | −0.311 | −0.667 | 0 |
| 3.248 | 3.1 | 2.46 | 1.5 | 0 | 0 | 0 | 0.5 | 0 | 0 | 0 | 1 | 0.062 | 0.133 | −1.200 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 1.778 | −1.333 | 0 | 0 |
| −0.08 | 0.4 | 0.4 | 0 | 0 | 0 | −1 | 0 | 0 | 0 | 0 | 0 | −0.326 | 1.778 | −1.333 | 0 |
| 0.01 | 0.06 | −0.3 | −0.3 | 0 | 0 | 0 | 0.75 | 0 | 0 | 0 | 0 | 0.119 | 0.244 | −1.333 | 1 |

Multiply Equation-8 by (−1/0.75)

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 2.66 | 1.7 | 0 | 0 | 0 | 0 | 0 | 0 | 0 | 1 | 0 | 0 | −0.311 | −0.667 | 0 | 0 |
| 3.06 | 2.66 | 1.7 | 0 | 0 | 0 | 0 | 0 | 0 | 0 | 1 | 0 | −0.030 | −0.311 | −0.667 | 0 |

-continued

| | | | | | | | | | | | | | | | |
|---|---|---|---|---|---|---|---|---|---|---|---|---|---|---|---|
| 3.248 | 3.1 | 2.46 | 1.5 | 0 | 0 | 0 | 0.5 | 0 | 0 | 0 | 1 | 0.062 | 0.133 | −1.200 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 1.778 | −1.333 | 0 | 0 |
| −0.08 | 0.4 | 0.4 | 0 | 0 | 0 | −1 | 0 | 0 | 0 | 0 | 0 | −0.326 | 1.778 | −1.333 | 0 |
| −0.013 | −0.08 | 0.4 | 0.4 | 0 | 0 | 0 | ▓−1▓ | 0 | 0 | 0 | 0 | −0.158 | −0.326 | 1.778 | −1.333 |

Multiply Equation-5 by 0.5, add it to Equation-4 and replace Equation-4

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 2.66 | 1.7 | 0 | 0 | 0 | 0 | 0 | 0 | 0 | 1 | 0 | 0 | −0.311 | −0.667 | 0 | 0 |
| 3.06 | 2.66 | 1.7 | 0 | 0 | 0 | 0 | 0 | 0 | 0 | 1 | 0 | −0.030 | −0.311 | −0.667 | 0 |
| 3.241 | 3.06 | 2.66 | 1.7 | 0 | 0 | 0 | 0 | 0 | 0 | 0 | 1 | −0.017 | −0.030 | −0.311 | −0.667 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 1.778 | −1.333 | 0 | 0 |
| −0.08 | 0.4 | 0.4 | 0 | 0 | 0 | −1 | 0 | 0 | 0 | 0 | 0 | −0.326 | 1.778 | −1.333 | 0 |
| −0.013 | −0.08 | 0.4 | 0.4 | 0 | 0 | 0 | −1 | 0 | 0 | 0 | 0 | −0.158 | −0.326 | 1.778 | −1.333 |

Rearrange Equations

| | | | | | | | | | | | | | | | |
|---|---|---|---|---|---|---|---|---|---|---|---|---|---|---|---|
| 1.7 | 0 | 0 | 0 | 0.667 | 0 | 0 | 0 | 1 | 0 | 0 | 0 | 0 | 0 | 0 | 0 |
| 2.66 | 1.7 | 0 | 0 | 0.311 | 0.667 | 0 | 0 | 0 | 1 | 0 | 0 | 0 | 0 | 0 | 0 |
| 3.06 | 2.66 | 1.7 | 0 | 0.030 | 0.311 | 0.667 | 0 | 0 | 0 | 1 | 0 | 0 | 0 | 0 | 0 |
| 3.241 | 3.06 | 2.66 | 1.7 | 0.017 | 0.030 | 0.311 | 0.667 | 0 | 0 | 0 | 1 | 0 | 0 | 0 | 0 |
| 0.4 | 0 | 0 | 0 | 1.333 | 0 | 0 | 0 | 0 | 0 | 0 | 0 | 1 | 0 | 0 | 0 |
| 0.4 | 0.4 | 0 | 0 | −1.778 | 1.333 | 0 | 0 | 0 | 0 | 0 | 0 | 0 | 1 | 0 | 0 |
| −0.08 | 0.4 | 0.4 | 0 | 0.326 | −1.778 | 1.333 | 0 | 0 | 0 | 0 | 0 | 0 | 0 | 1 | 0 |
| −0.013 | −0.08 | 0.4 | 0.4 | 0.158 | 0.326 | −1.778 | 1.333 | 0 | 0 | 0 | 0 | 0 | 0 | 0 | 1 |

▓ Indicates Pivot Element

Accumulate coefficients for new $2^{nd}$ independent variable

| | | | | | | | |
|---|---|---|---|---|---|---|---|
| 1.700 | 0.000 | 0.000 | 0.000 | 0.667 | 0.000 | 0.000 | 0.000 |
| 2.660 | 1.700 | 0.000 | 0.000 | 0.978 | 0.667 | 0.000 | 0.000 |
| 3.060 | 2.660 | 1.700 | 0.000 | 1.007 | 0.978 | 0.667 | 0.000 |
| 3.241 | 3.060 | 2.660 | 1.700 | 1.024 | 1.007 | 0.978 | 0.667 |
| 0.400 | 0.000 | 0.000 | 0.000 | 1.333 | 0.000 | 0.000 | 0.000 |
| 0.400 | 0.400 | 0.000 | 0.000 | −0.444 | 1.333 | 0.000 | 0.000 |
| −0.080 | 0.400 | 0.400 | 0.000 | −0.119 | −0.444 | 1.333 | 0.000 |
| −0.013 | −0.080 | 0.400 | 0.400 | 0.040 | −0.119 | −0.444 | 1.333 |

Accumulate coefficients for new $2^{nd}$ independent variables

| | | | | | | | |
|---|---|---|---|---|---|---|---|
| 1.700 | 0.000 | 0.000 | 0.000 | 0.667 | 0.000 | 0.000 | 0.000 |
| 2.660 | 1.700 | 0.000 | 0.000 | 0.978 | 0.667 | 0.000 | 0.000 |
| 3.060 | 2.660 | 1.700 | 0.000 | 1.007 | 0.978 | 0.667 | 0.000 |
| 3.241 | 3.060 | 2.660 | 1.700 | 1.024 | 1.007 | 0.978 | 0.667 |
| 0.400 | 0.000 | 0.000 | 0.000 | 1.333 | 0.000 | 0.000 | 0.000 |
| 0.800 | 0.400 | 0.000 | 0.000 | 0.889 | 1.333 | 0.000 | 0.000 |
| 0.720 | 0.800 | 0.400 | 0.000 | 0.770 | 0.889 | 1.333 | 0.000 |
| 0.707 | 0.720 | 0.800 | 0.400 | 0.810 | 0.770 | 0.889 | 1.333 |

The new model coefficients with the PID dynamics removed are as follows:

| Dependent Var-1 | |
|---|---|
| Independent Var-1 | Independent Var-2 |
| $a_{1,1,1} = 1.700$ | $a_{1,2,1} = 0.667$ |
| $a_{1,1,2} = 2.660$ | $a_{1,2,2} = 0.978$ |
| $a_{1,1,3} = 3.060$ | $a_{1,2,3} = 1.007$ |
| $a_{1,1,4} = 3.241$ | $a_{1,2,4} = 1.024$ |

| Dependent Var-2 | |
|---|---|
| Independent Var-1 | Independent Var-2 |
| $a_{2,1,1} = 0.400$ | $a_{2,2,1} = 1.333$ |
| $a_{2,1,2} = 0.800$ | $a_{2,2,2} = 0.889$ |
| $a_{2,1,3} = 0.720$ | $a_{2,2,3} = 0.770$ |
| $a_{2,1,4} = 0.707$ | $a_{2,2,4} = 0.810$ |

Note that all the coefficient values changed.
Check that corresponding Impulse coefficients match those identified with the FIR example.

| Dependent Var-1 | |
|---|---|
| Independent Var-1 | Independent Var-2 |
| $b_{1,1,1} = 1.700$ | $b_{1,2,1} = 0.667$ |
| $b_{1,1,2} = 0.960$ | $b_{1,2,2} = 0.311$ |
| $b_{1,1,3} = 0.400$ | $b_{1,2,3} = 0.030$ |
| $b_{1,1,4} = 0.181$ | $b_{1,2,4} = 0.017$ |

| Dependent Var-2 | |
|---|---|
| Independent Var- | Independent Var-2 |
| $b_{2,1,1} = 0.400$ | $b_{12,2,1} = 1.333$ |
| $b_{2,1,2} = 0.400$ | $b_{2,2,2} = 0.444$ |
| $b_{2,1,3} = -0.080$ | $b_{2,2,3} = -0.119$ |
| $b_{12,1,4} = -0.013$ | $b_{2,2,4} = 0.040$ |

Column Simulation Example

Yet another embodiment of the use of the algorithm is demonstrated in the following example. This example will illustrate the following:

The use of a valve-based Finite Impulse Response (FIR) model as a process simulator.

Plant step-test and Identification of an FIR model based on a specific regulatory control configuration.

Use of the proposed algorithm to remove the PID controller dynamics and recover the underlying valve-based model.

In this example, an FIR model based on valve positions is used as the process model to simulate the behavior of a complex fractionator. The regulatory control for the fractionator consists of three PI (proportional/integral) feedback controllers. A plant step test is performed on the simulation using the regulatory controller set points. An FIR model is then obtained for the fractionator based on the set points of the PI controllers. This model based on the regulatory control scheme is then input to the algorithm to remove the PI controller dynamics and recover the original FIR process model.

It should be noted that the term Finite Impulse Response (FIR) model is used to refer to the open-loop step response form of the models, since the step form could be directly calculated from the impulse coefficients.

Description of Complex Fractionator Schematic

The schematic for the Complex Fractionator is shown in FIG. 1. The feed flow rate 5 is controlled by the upstream unit and is pre-heated in a furnace 6. The fractionator 7 has a top, middle and bottom product. The fractionator overhead temperature is controlled with a PI controller 8 moving the top reflux. The middle product draw temperature is controlled with a PI controller 9 moving the middle product draw rate. A third PI controller 10 moves the bottom product rate to control the fractionator bottoms level. The bottom composition (light component) is measured with an analyzer 11.

Description of Finite Impulse Response (FIR) Model

The process model used in this example is an open-loop, step response model based on the valve positions, summarized as follows:

Model Independent Variables
TIC-2001.OP—Top Reflux Flow Valve
TIC-2002.OP—Middle Product Flow Valve
LIC-2007.OP—Bottoms Product Flow Valve
FIC-2004.SP—Middle Reflux Flow Rate
FI-2005.PV—Fractionator Feed Rate
Model Dependent Variables
TIC-2001.PV—Fractionator Overhead Temperature
TIC-2002.PV—Middle Product Draw Temperature
LIC-2007.PV—Fractionator Bottoms Level
AI-2022.PV—Fractionator Bottoms Composition (Light Component)

The open-loop step response model can be viewed in an idealized sense as being generated as follows. With the system at steady state, the first independent variables is increased by one engineering unit at time=0 while holding all other independent variables constant. The values for all dependent variables are then measured at equally spaced time intervals until the system reaches steady state again. The model response curves for each dependent variable with respect to the first independent variable are then calculated by subtracting the value of the dependent variable at time=0 from each of the measured values at each future time interval for that dependent variables. Essentially, a step response curve represents the effect on the dependent variable of a change in the independent variable. This process is then repeated successively for all the independent variables to generate the full model. The steady state time for the model is defined by the steady state time of the slowest response curve in the system.

Clearly in the real world, the model cannot be generated in this fashion since often the process is not at steady state. Further, it is impossible to prevent measured and unmeasured disturbances from affecting the system during an independent variable step. Generation of the model requires that multiple steps be made in each independent variable (plant step test). The data thus collected is then analyzed with a software package such as AspenTech's DMCplus Model program to calculate the open-loop step response model.

Once such a model has been identified, it can be used to predict future system response based on past changes in the independent variables. That is to say, if we know how all independent variables have changed for one steady-state time into the past, we can use the model to predict how the dependent variables will change for one steady-state time into the future, assuming no further independent variable changes. This illustrates the use of the model for Prediction. (This is the basis for using an FIR model as a process simulator).

Given the predicted future system response based on no further independent variable changes and given the constraints on all independent and dependent variables, the model can be used to plan a strategy of independent variable moves to keep all independent and dependent variables within constraints. This illustrates the use of the model for Control.

Using a Finite Impulse Response (FIR) Model as a Process Simulator

The model for this example has a steady state time of ninety (90) minutes. A three (3) minute time interval is used. The resulting response curves are each defined by a vector of thirty (30) numbers representing the accumulative change in that dependent variable across time with respect to a step change in the independent variable at time=0 while holding all other independent variables constant.

Figure 2:
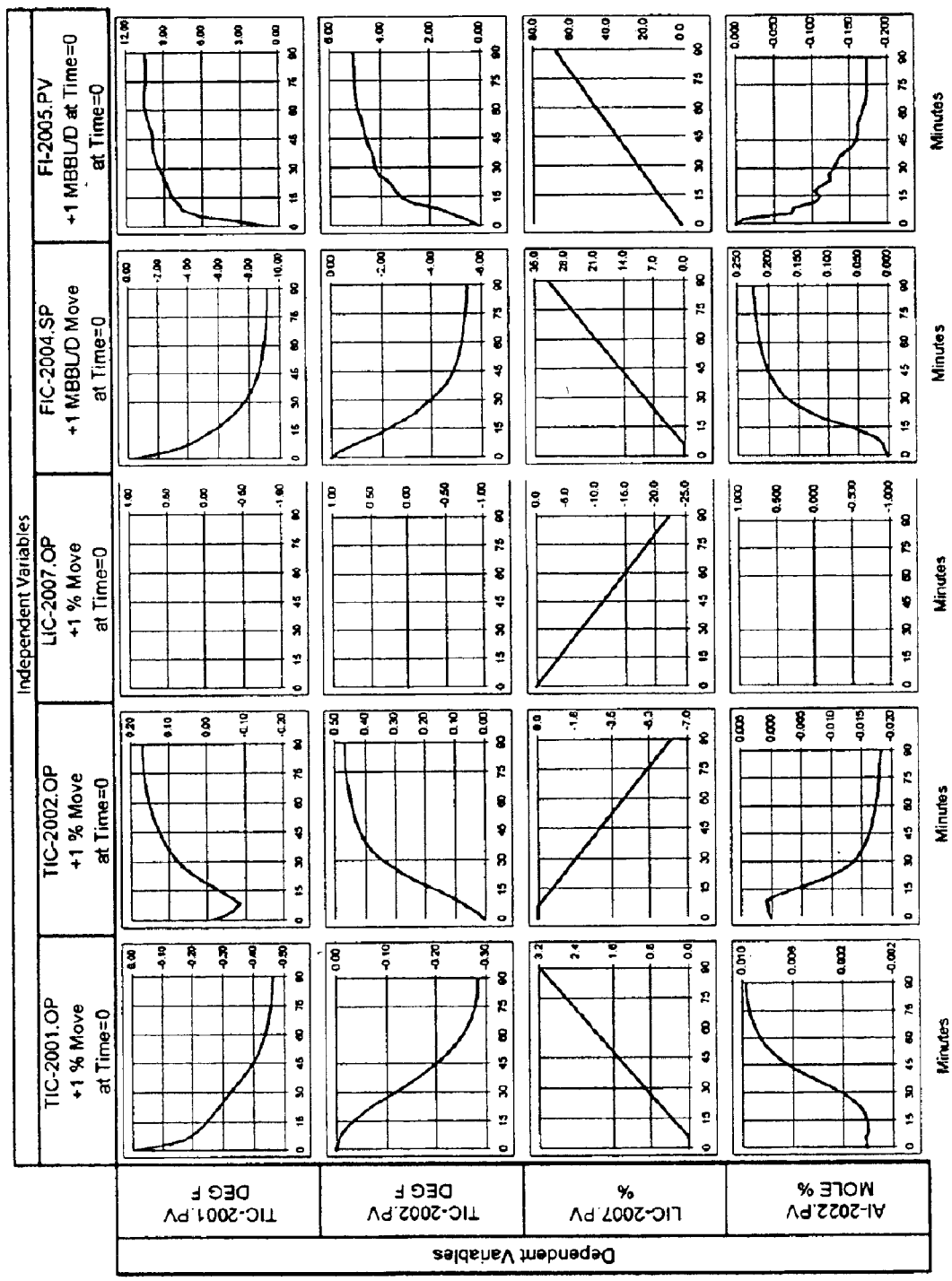
FIG. 2 is a simulation of the fractionator model based on valve positions

The model coefficients are shown in Table 1 and the model plots are shown in FIG. 2. This model, based on valve positions, is used to predict future system behavior in the model dependent variables based on past and present changes in the model independent variables.

TABLE 1

Fractionator Simulation Valve-based Model Coefficients

| Minutes | TIC-2001.OP +1% Move at Time = 0 | TIC-2002.OP +1% Move at Time = 0 | LIC-2007.OP +1% Move at Time = 0 | FIC-2004.SP +1 MBBL/D Move at Time = 0 | FI-2005.PV +1 MBBL/D Move at Time = 0 |
|---|---|---|---|---|---|
| | Step Response Coefficients for Dependent Variable-1: TIC-2001.PV DEG F | | | | |
| 0 | 0.000 | 0.000 | 0.0 | 0.00 | 0.0 |
| 3 | −0.101 | −0.048 | 0.0 | −2.05 | 2.9 |
| 6 | −0.175 | −0.076 | 0.0 | −3.58 | 6.1 |
| 9 | −0.206 | −0.088 | 0.0 | −4.43 | 7.5 |

TABLE 1-continued

Fractionator Simulation Valve-based Model Coefficients

| Minutes | TIC-2001.OP +1% Move at Time = 0 | TIC-2002.OP +1% Move at Time = 0 | LIC-2007.OP +1% Move at Time = 0 | FIC-2004.SP +1 MBBL/D Move at Time = 0 | FI-2005.PV +1 MBBL/D Move at Time = 0 |
|---|---|---|---|---|---|
| 12 | −0.227 | −0.068 | 0.0 | −5.03 | 7.8 |
| 15 | −0.245 | −0.040 | 0.0 | −5.58 | 8.2 |
| 18 | −0.262 | −0.015 | 0.0 | −6.16 | 8.5 |
| 21 | −0.277 | 0.010 | 0.0 | −6.65 | 8.6 |
| 24 | −0.292 | 0.033 | 0.0 | −7.04 | 8.9 |
| 27 | −0.306 | 0.054 | 0.0 | −7.37 | 9.0 |
| 30 | −0.323 | 0.069 | 0.0 | −7.67 | 9.3 |
| 33 | −0.340 | 0.084 | 0.0 | −7.95 | 9.5 |
| 36 | −0.356 | 0.096 | 0.0 | −8.18 | 9.6 |
| 39 | −0.372 | 0.105 | 0.0 | −8.37 | 9.8 |
| 42 | −0.386 | 0.113 | 0.0 | −8.52 | 9.8 |
| 45 | −0.399 | 0.121 | 0.0 | −8.65 | 9.8 |
| 48 | −0.410 | 0.128 | 0.0 | −8.75 | 9.9 |
| 51 | −0.420 | 0.135 | 0.0 | −8.84 | 10.0 |
| 54 | −0.428 | 0.140 | 0.0 | −8.92 | 10.1 |
| 57 | −0.435 | 0.145 | 0.0 | −8.98 | 10.3 |
| 60 | −0.440 | 0.149 | 0.0 | −9.04 | 10.4 |
| 63 | −0.445 | 0.153 | 0.0 | −9.09 | 10.5 |
| 66 | −0.450 | 0.156 | 0.0 | −9.13 | 10.5 |
| 69 | −0.453 | 0.159 | 0.0 | −9.17 | 10.5 |
| 72 | −0.457 | 0.161 | 0.0 | −9.21 | 10.5 |
| 75 | −0.460 | 0.163 | 0.0 | −9.24 | 10.4 |
| 78 | −0.462 | 0.165 | 0.0 | −9.26 | 10.4 |
| 81 | −0.464 | 0.166 | 0.0 | −9.28 | 10.4 |
| 84 | −0.465 | 0.167 | 0.0 | −9.29 | 10.4 |
| 87 | −0.466 | 0.167 | 0.0 | −9.29 | 10.4 |
| 90 | −0.466 | 0.167 | 0.0 | −9.29 | 10.5 |
| Step Response Coefficients for Dependent Variable-2: TIC-2002.PV DEG F | | | | | |
| 0 | 0.000 | 0.000 | 0.0 | 0.00 | 0.00 |
| 3 | −0.002 | 0.020 | 0.0 | −0.28 | 0.46 |
| 6 | −0.008 | 0.052 | 0.0 | −0.73 | 1.06 |
| 9 | −0.012 | 0.081 | 0.0 | −1.26 | 1.62 |
| 12 | −0.021 | 0.118 | 0.0 | −1.77 | 2.63 |
| 15 | −0.032 | 0.157 | 0.0 | −2.23 | 3.12 |
| 18 | −0.046 | 0.201 | 0.0 | −2.64 | 3.34 |
| 21 | −0.061 | 0.242 | 0.0 | −3.06 | 3.50 |
| 24 | −0.077 | 0.277 | 0.0 | −3.40 | 3.69 |
| 27 | −0.097 | 0.308 | 0.0 | −3.67 | 4.05 |
| 30 | −0.117 | 0.335 | 0.0 | −3.93 | 4.18 |
| 33 | −0.136 | 0.360 | 0.0 | −4.19 | 4.22 |
| 36 | −0.153 | 0.380 | 0.0 | −4.42 | 4.26 |
| 39 | −0.170 | 0.396 | 0.0 | −4.62 | 4.33 |
| 42 | −0.186 | 0.407 | 0.0 | −4.78 | 4.46 |
| 45 | −0.201 | 0.416 | 0.0 | −4.90 | 4.55 |
| 48 | −0.214 | 0.423 | 0.0 | −4.99 | 4.61 |
| 51 | −0.225 | 0.430 | 0.0 | −5.07 | 4.64 |
| 54 | −0.236 | 0.436 | 0.0 | −5.13 | 4.70 |
| 57 | −0.246 | 0.440 | 0.0 | −5.19 | 4.77 |
| 60 | −0.253 | 0.445 | 0.0 | −5.23 | 4.85 |
| 63 | −0.260 | 0.449 | 0.0 | −5.27 | 4.90 |
| 66 | −0.266 | 0.452 | 0.0 | −5.30 | 4.94 |
| 69 | −0.272 | 0.455 | 0.0 | −5.33 | 4.96 |
| 72 | −0.276 | 0.458 | 0.0 | −5.36 | 4.98 |
| 75 | −0.279 | 0.460 | 0.0 | −5.38 | 4.98 |
| 78 | −0.282 | 0.462 | 0.0 | −5.40 | 4.99 |
| 81 | −0.284 | 0.463 | 0.0 | −5.42 | 5.00 |
| 84 | −0.285 | 0.464 | 0.0 | −5.44 | 5.01 |
| 87 | −0.285 | 0.465 | 0.0 | −5.45 | 5.02 |
| 90 | −0.285 | 0.465 | 0.0 | −5.46 | 5.04 |
| Step Response Coefficients for Dependent Variable-3: LIC-2001.PV % | | | | | |
| 0 | 0.00 | 0.00 | 0.0 | 0.0 | 0.0 |
| 3 | 0.00 | 0.00 | −0.8 | 0.0 | 2.3 |
| 6 | 0.00 | 0.00 | −1.5 | 0.0 | 4.5 |
| 9 | 0.11 | −0.23 | −2.3 | 1.1 | 6.8 |
| 12 | 0.23 | −0.45 | −3.0 | 2.3 | 9.0 |
| 15 | 0.34 | −0.68 | −3.8 | 3.4 | 11.3 |
| 18 | 0.45 | −0.90 | −4.5 | 4.5 | 13.5 |
| 21 | 0.56 | −1.13 | −5.3 | 5.6 | 15.8 |
| 24 | 0.68 | −1.35 | −6.0 | 6.8 | 18.0 |
| 27 | 0.79 | −1.58 | −6.8 | 7.9 | 20.3 |
| 30 | 0.90 | −1.80 | −7.5 | 9.0 | 22.5 |

TABLE 1-continued

Fractionator Simulation Valve-based Model Coefficients

| Minutes | TIC-2001.OP +1% Move at Time = 0 | TIC-2002.OP +1% Move at Time = 0 | LIC-2007.OP +1% Move at Time = 0 | FIC-2004.SP +1 MBBL/D Move at Time = 0 | FI-2005.PV +1 MBBL/D Move at Time = 0 |
|---|---|---|---|---|---|
| 33 | 1.01 | −2.03 | −8.3 | 10.1 | 24.8 |
| 36 | 1.13 | −2.25 | −9.0 | 11.3 | 27.0 |
| 39 | 1.24 | −2.48 | −9.8 | 12.4 | 29.3 |
| 42 | 1.35 | −2.70 | −10.5 | 13.5 | 31.5 |
| 45 | 1.46 | −2.93 | −11.3 | 14.6 | 33.8 |
| 48 | 1.58 | −3.15 | −12.0 | 15.8 | 36.0 |
| 51 | 1.69 | −3.38 | −12.8 | 16.9 | 38.3 |
| 54 | 1.80 | −3.60 | −13.5 | 18.0 | 40.5 |
| 57 | 1.91 | −3.83 | −14.3 | 19.1 | 42.8 |
| 60 | 2.03 | −4.05 | −15.0 | 20.3 | 45.0 |
| 63 | 2.14 | −4.28 | −15.8 | 21.4 | 47.3 |
| 66 | 2.25 | −4.50 | −16.5 | 22.5 | 49.5 |
| 69 | 2.36 | −4.73 | −17.3 | 23.6 | 51.8 |
| 72 | 2.48 | −4.95 | −18.0 | 24.8 | 54.0 |
| 75 | 2.59 | −5.18 | −18.8 | 25.9 | 56.3 |
| 78 | 2.70 | −5.40 | −19.5 | 27.0 | 58.5 |
| 81 | 2.81 | −5.63 | −20.3 | 28.1 | 60.8 |
| 84 | 2.93 | −5.85 | −21.0 | 29.3 | 63.0 |
| 87 | 3.04 | −6.08 | −21.8 | 30.4 | 65.3 |
| 90 | 3.15 | −6.30 | −22.5 | 31.5 | 67.5 |
| Step Response Coefficients for Dependent Variable-4: AI-2022.PV MOLE % | | | | | |
| 0 | 0.00000 | 0.0000 | 0.0 | 0.000 | 0.000 |
| 3 | 0.00004 | 0.0004 | 0.0 | 0.004 | −0.010 |
| 6 | 0.00010 | 0.0005 | 0.0 | 0.008 | −0.073 |
| 9 | −0.00014 | 0.0008 | 0.0 | 0.017 | −0.076 |
| 12 | −0.00006 | −0.0007 | 0.0 | 0.037 | −0.105 |
| 15 | −0.00003 | −0.0034 | 0.0 | 0.060 | −0.112 |
| 18 | 0.00013 | −0.0062 | 0.0 | 0.090 | −0.104 |
| 21 | 0.00033 | −0.0087 | 0.0 | 0.114 | −0.113 |
| 24 | 0.00075 | −0.0109 | 0.0 | 0.134 | −0.126 |
| 27 | 0.00125 | −0.0125 | 0.0 | 0.152 | −0.124 |
| 30 | 0.00193 | −0.0137 | 0.0 | 0.165 | −0.130 |
| 33 | 0.00277 | −0.0145 | 0.0 | 0.175 | −0.134 |
| 36 | 0.00368 | −0.0151 | 0.0 | 0.183 | −0.137 |
| 39 | 0.00459 | −0.0157 | 0.0 | 0.189 | −0.144 |
| 42 | 0.00542 | −0.0161 | 0.0 | 0.194 | −0.154 |
| 45 | 0.00615 | −0.0164 | 0.0 | 0.199 | −0.161 |
| 48 | 0.00679 | −0.0167 | 0.0 | 0.203 | −0.162 |
| 51 | 0.00733 | −0.0170 | 0.0 | 0.206 | −0.162 |
| 54 | 0.00778 | −0.0172 | 0.0 | 0.208 | −0.163 |
| 57 | 0.00815 | −0.0174 | 0.0 | 0.211 | −0.165 |
| 60 | 0.00846 | −0.0175 | 0.0 | 0.213 | −0.168 |
| 63 | 0.00872 | −0.0177 | 0.0 | 0.214 | −0.171 |
| 66 | 0.00893 | −0.0178 | 0.0 | 0.216 | −0.173 |
| 69 | 0.00911 | −0.0179 | 0.0 | 0.217 | −0.175 |
| 72 | 0.00926 | −0.0180 | 0.0 | 0.218 | −0.176 |
| 75 | 0.00938 | −0.0181 | 0.0 | 0.219 | −0.176 |
| 78 | 0.00948 | −0.0182 | 0.0 | 0.220 | −0.175 |
| 81 | 0.00956 | −0.0182 | 0.0 | 0.221 | −0.175 |
| 84 | 0.00962 | −0.0183 | 0.0 | 0.222 | −0.175 |
| 87 | 0.00966 | −0.0184 | 0.0 | 0.222 | −0.175 |
| 90 | 0.00967 | −0.0185 | 0.0 | 0.223 | −0.175 |

As mentioned above, there are three PI (Proportional/Integral) controllers in the system. These PI controllers are configured as follows:

TABLE 2

Fractionator PID Controllers

| PID Loop Name | Set Point | Process Variable | Output | $K_p$ | $K_i$ |
|---|---|---|---|---|---|
| Top Temperature | TIC-2001.SP | TIC-2001.PV | TIC-2001.OP | −2.0 | 3.0 |
| Middle Product Draw Temperature | TIC-2002.SP | TIC-2002.PV | TIC-2002.OP | 3.0 | 8.0 |
| Bottoms Level | LIC-2001.SP | LIC-2001.PV | LIC-2007.OP | −1.0 | 4.0 |

Figure 3:
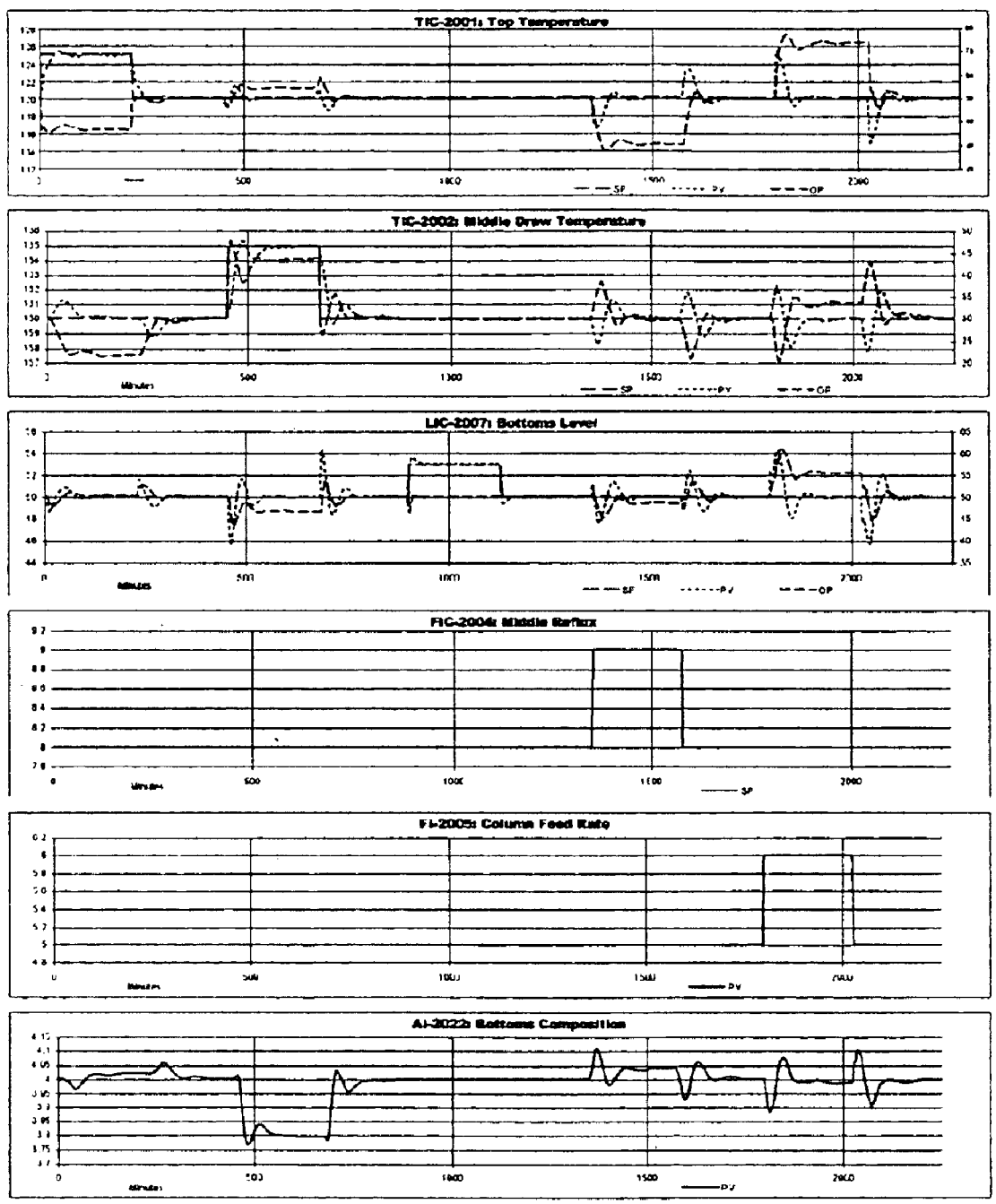
FIG. 3 demonstrates the results from a plant test of the fractionator

A plant test was performed (data plots in FIG. 3) with these PI controllers regulating the process. The independent and dependent variables for the system were as follows:

Model Independent Variables
TIC-2001.SP—Top Reflux Flow Valve SP
TIC-2002.SP—Middle Product Flow Valve SP
LIC-2007.SP—Bottoms Product Flow Valve SP
FIC-2004.SP—Middle Reflux Flow Rate
FI-2005.PV—Fractionator Feed Rate
Model Dependent Variables
TIC-2001.PV—Fractionator Overhead Temperature
TIC-2002.PV—Middle Product Draw Temperature
LIC-2007.PV—Fractionator Bottoms Level
TIC-2001.OP—Top Reflux Flow Valve
TIC-2002.OP—Middle Product Flow Valve
LIC-2007.OP—Bottoms Product Flow Valve
AI-2022.PV—Fractionator Bottoms Composition (Light Component)

This illustrates the use of a valve-based FIR model as a process simulator. As described above, the PID control calculations were performed external to the process simulation.

Figure 4:
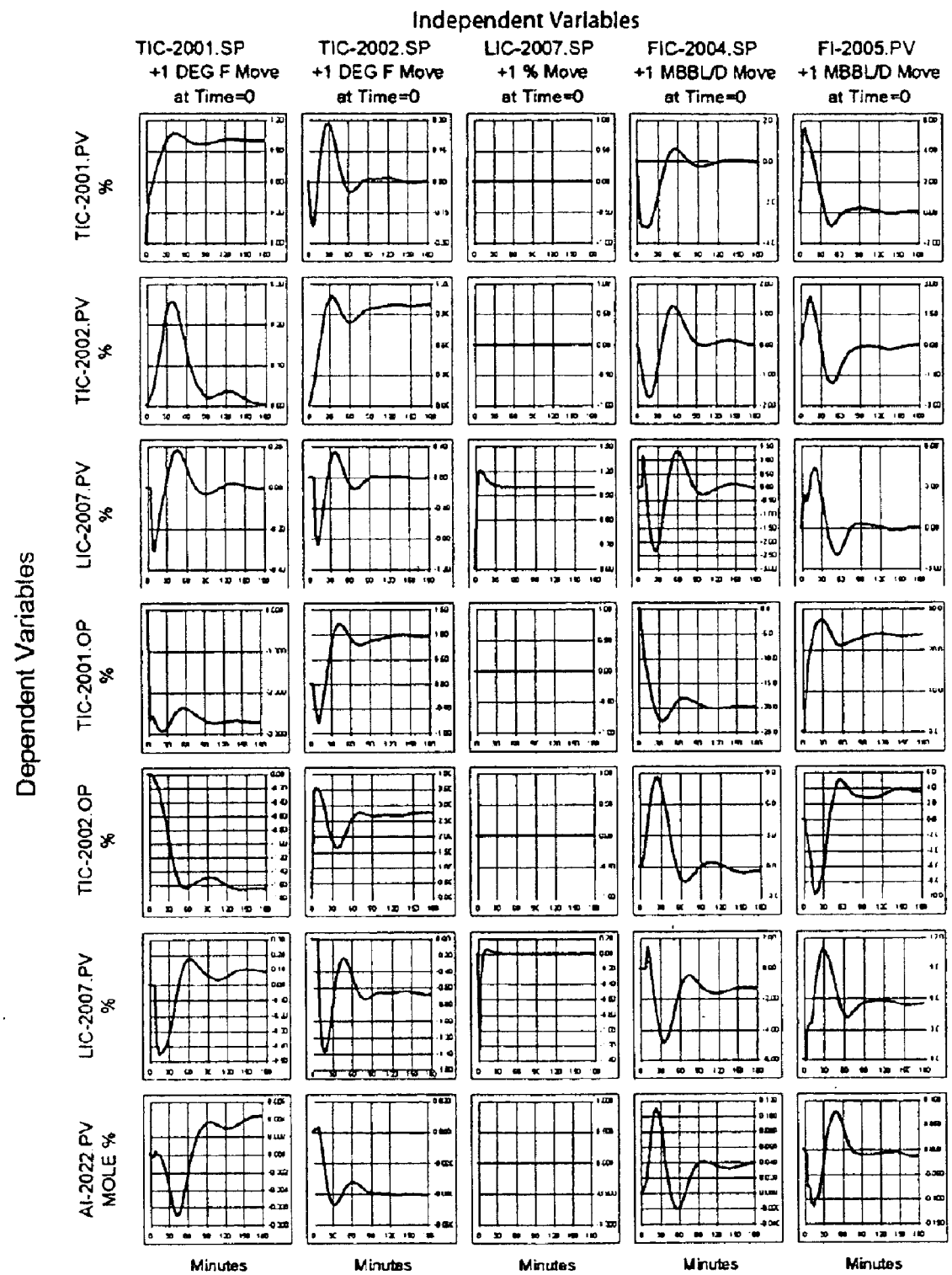
FIG. 4 is a simulation of the fractionator with the PID controllers

The resulting data were analyzed and a model based on this PID configuration was identified, as shown in FIG. 4.

Figure 5:
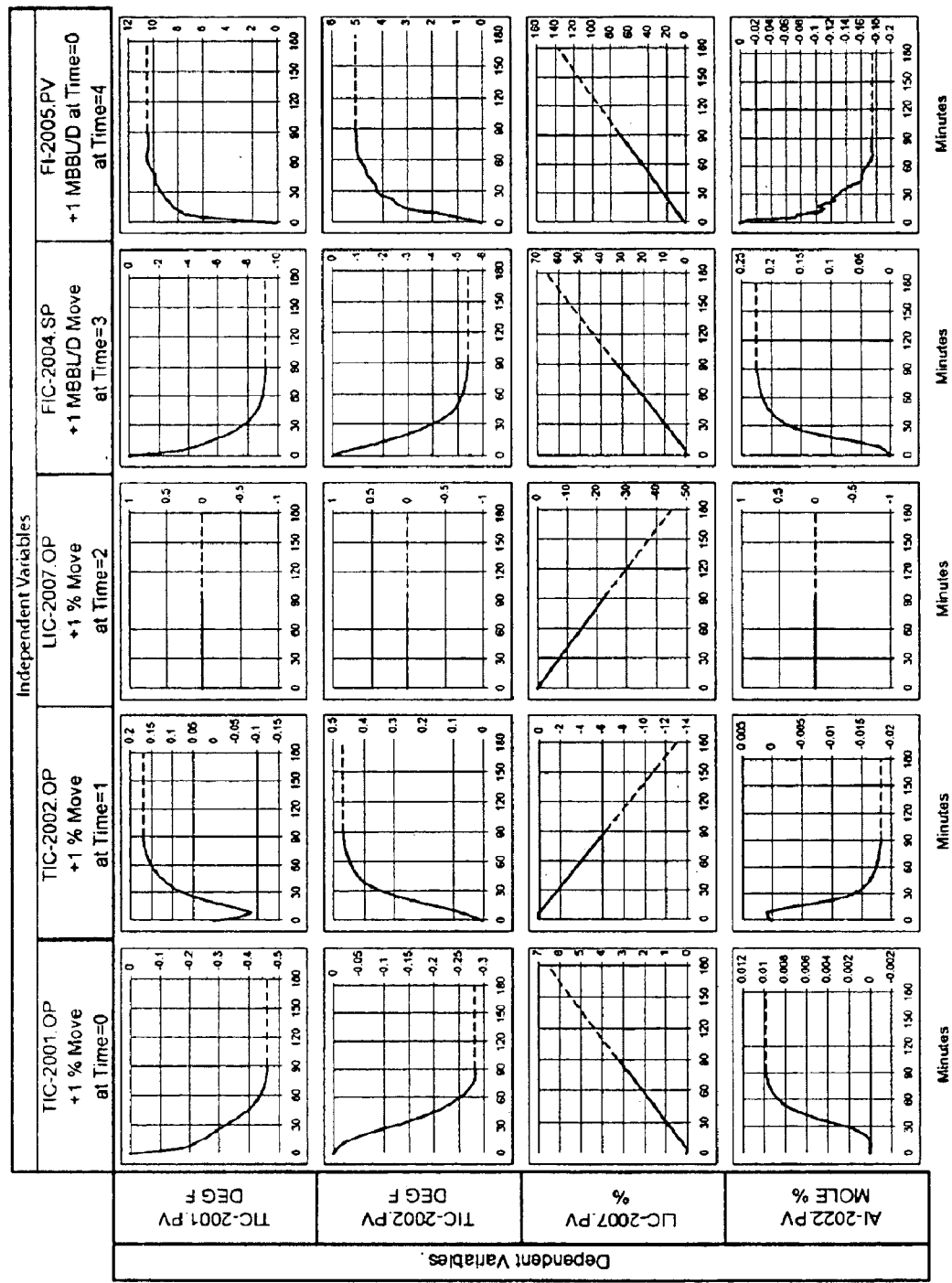
FIG. 5 is a demonstration of the fractionator with the original and recovered values

The new algorithm to remove PID dynamics was applied to the model shown in FIG. 4, and this model with the PID dynamics removed is compared to the original simulation model. As can be seen in FIG. 5, the algorithm successfully recovers the original valve based model. Note that the steady state time of the recovered model is longer than the steady state time of the original model. This is a result of a longer steady state time for the model with the PID controllers. The original valve-based simulation model had a steady state time of 90 minutes. When the PID controllers were configured and the plant step-test performed, it took 180 minutes for the process to reach steady state, due to having to wait for the PID feedback control to settle out. The steady state time of the recovered valve-based model has the same steady state time as the model containing the PID dynamics from which it was generated. It can be seen, however, that the recovered model has reached steady state in 90 minutes, and if it were truncated at that point, would exactly match the original valve-based model.

Applicability of the Invention

In the past, when the PID controllers were re-tuned or when the regulatory control scheme was reconfigured, a new plant was performed and a new model constructed. The invention described in this document removes the PID controller dynamics without having to perform another plant test.

This ability to remove PID dynamics allows creation of an off-line process simulator based only on valve positions instead of PID set points. The plant test can be performed with any stable regulatory configuration and PID tuning and a corresponding model can be obtained. The algorithm to remove the PID dynamics is then applied to the resulting model to remove the dynamics of all PID controllers and convert the model inputs from set points to valves. The regulatory control scheme can then be emulated external to the process model via a DCS console or console emulator. This allows the operator to put PID controllers in Manual-mode, break cascades, retune PID controller, or even re-configure the regulatory control scheme.

With regard to model-based control applications, there are times when it is necessary to modify the PID tuning of a PID controller in the system. With the ability to remove the PID dynamics, a model can be generated which is based on the valve of this PID controller. The off-line simulation calculation can then be performed to generate a new process model that contains the new PID tuning, and this updated model can be incorporated into the model based controller, thus preventing a plant step test. This technique can also be applied if the regulatory control scheme is to be reconfigured. Assume that we have a temperature controller set point as an input to our model. If that valve is stuck and cannot be repaired without shutting the unit down, the algorithm could be applied to remove the dynamics of the temperature controller and the control application could continue to be used without the temperature controller.

Another advantage of this invention is that a process can be tested in one regulatory configuration and a model-based controller can be commissioned with a different configuration. An example is a Fluidized Bed Catalytic Cracking Unit (FCCU) where the system pressure is controlled with a PID controller moving the speed of the Wet Gas Compressor. Often the most economical place to run the unit is with the compressor at maximum speed, but in this case, the pressure is not directly controlled. Testing the unit with the pressure off control is difficult. The solution is to test the plant with the PID controller moving the compressor speed, keeping the speed on control. When the model is obtained, the pressure controller PID dynamics are removed and the model based control application will them move the compressor speed directly. In this example, the model based control application controls the system pressure as an output by manipulating other inputs when the compressor speed is at maximum.

Often when testing a unit, valves of certain PID controllers are driven off control during the plant test. At the present time, this data cannot be used in constructing the process model. With the new algorithm, it is possible to use all the data, even when a PID controller is off control. This is done by first identifying the model as before using data only where the PID controller is on control. This model is then modified to remove the PID dynamics and the new data is "filtered into" the model.

Thus, this new invention will allow construction of high fidelity, useable off-line process simulators and will enhance the ability to implement and maintain model-based control applications.

While a preferred form of the invention has been disclosed and described in the drawings, since variations in the preferred form will be evident to those skilled in the art, the invention should not be construed as limited to the specific forms shown and described, but instead is as set forth in the following claims when read in the light of the foregoing disclosure.

I claim:

1. A method used in model predictive control applications for removing the effect of unmeasured disturbances from the dynamics of a controller model of a process having a plurality of independently controllable, manipulated variables and at least one controlled variable dependent upon said independently controllable, manipulated variables comprising the steps of:

gathering data about said process by separately introducing a test disturbance in each of said manipulated variables and measuring the effect of the disturbances on said controlled variable;

using said effects of the disturbances on said controlled variable to generate a first linearized dynamic model relating said at least one controlled variable to said independently controllable, manipulated variables;

interchanging selected valve position controlled variables with their corresponding selected independently controllable, manipulated PID controller set point variables in said first linearized dynamic model using matrix row elimination mathematics to generate a second linearized dynamic model that has a new set of independently controllable, manipulated variables, said second linearized dynamic model having the dynamics of said selected independently controllable, manipulated PID controller set point variables removed from said second dynamic model.

2. The method of claim 1 wherein said first linearized dynamic model is a step response model.

3. The method of claim 1 wherein said first linearized dynamic model is a finite impulse model.

4. A method for controlling a process having a plurality of independently controllable, manipulated variables and at least one controlled variable dependent upon said independently controllable, manipulated variables comprising the steps of:
- gathering data about said process by separately introducing a test disturbance in each of said manipulated variables and measuring the effect of the disturbances on said controlled variable;
- using said effects of the disturbances on said controlled variable to generate a first linearized dynamic model relating said at least one controlled variable to said independently controllable, manipulated variables;
- interchanging selected valve position controlled variables with their corresponding selected independently controllable, manipulated PID controller set point variables in said first linearized dynamic model using matrix row elimination mathematics to generate a second linearized dynamic model that has a new set of independently controllable, manipulated variables, said second linearized dynamic model having the dynamics of said selected independently controllable, manipulated PID controller set point variables removed from said second linearized dynamic model;
- measuring the present value of said variables;
- calculating for discrete intervals of time from said gathered data about said process, said measured present values and pre-selected operating constraints a set of moves for present and future times for at least said manipulated variables to obtain new values for said manipulated variables and to move said at least one dependent controllable variable towards at least one of said constraints; and
- changing said process by adjusting said manipulated variables for said set of moves for present and future times to cause said process to move said at least one dependent controllable variable towards at least one of said constraints.

5. The method of claim 4, wherein said process comprises at least one uncontrolled variable that is dependent on said manipulated variables and wherein said step of calculating said set of moves for present and future times further comprises calculating said set of moves such that said uncontrolled variable is limited to a predetermined constraint.

6. The method of claim 5, wherein said step of calculating said set of moves for present and future times further comprises calculating said set of moves such that at least one of said manipulated variables is limited to a predetermined constraint.

7. The method of claim 4, wherein said step of calculating said set of moves for present and future times comprises calculating said set of moves employing quadratic programming techniques.

8. The method of claim 7, wherein said step of calculating said set of moves for present and future times further comprises calculating said set of moves such that at least one of said manipulated variables is limited to a predetermined constraint.

9. The method of claim 7, wherein said process comprises at least one uncontrolled variable that is dependent on said manipulated variables and wherein said step of calculating said set of moves for present and future times further comprises calculating said set of moves such that said uncontrolled variable is limited to a predetermined constraint.

10. The method of claim 4, wherein said step of calculating said set of moves for present and future times comprises calculating said set of moves employing linear programming techniques.

11. The method of claim 10, wherein said step of calculating said set of moves for present and future times further comprises calculating said set of moves such that at least one of said manipulated variables is limited to a predetermined constraint.

12. The method of claim 10, wherein said process comprises at least one uncontrolled variable that is dependent on said manipulated variables and wherein said step of calculating said set of moves for present and future times further comprises calculating said set of moves such that said uncontrolled variable is limited to a predetermined constraint.

13. The method of claim 4, wherein said step of calculating said set of moves further comprises calculating said set of moves such that at least one of said manipulated variables is limited to a predetermined constraint.

14. The method of claim 13, wherein said process comprises at least one uncontrolled variable that is dependent on said manipulated variables and wherein said step of calculating said set of moves for present and future times further comprises calculating said set of moves such that said uncontrolled variable is limited to a predetermined constraint.

15. A method for developing a new linearized dynamic model of a process without performing a new plant identification test when the tuning of at least one PID controller in said process is changed comprising the steps of:
- interchanging said at least one PID controller set point variable in an original linearized dynamic model with its corresponding valve position controlled variable in said original linearized dynamic model using matrix row elimination mathematics to generate a secondary linearized dynamic model that has said at least one corresponding valve position as a new independently controllable, manipulated variable
- externally emulating new desired PID tuning via mathematical emulator to emulate the effect of said at least one PID controllers new tuning with the secondary linearized dynamic model
- testing the secondary linearized dynamic model with it's emulated PID tuning by stepping each of it's manipulated variables to obtain said new linearized dynamic model that will now contain the dynamics of said at least one PID controllers.

16. A method for creating an off-line process simulator for use in process simulation and for training simulators created by removing the effect of unmeasured disturbances from the dynamics of a controller model of a process having a plurality of independently controllable, manipulated variables and at least one controlled variable dependent upon said independently controllable, manipulated variables comprising the steps of:

gathering data about said process by separately introducing a test disturbance in each of said manipulated variables and measuring the effect of the disturbances on said controlled variable;

using said effects of the disturbances on said controlled variable to generate a first linearized dynamic model relating said at least one controlled variable to said independently controllable, manipulated variables;

interchanging each independently controllable, manipulated PID controller set point variable with its corresponding valve position controlled variable in said first linearized dynamic model using matrix row elimination mathematics to generate a second linearized dynamic model that has said corresponding valve positions as a new set of independently controllable, manipulated variables, said second linearized dynamic model having the dynamics of said selected independently controllable, manipulated PID controller set point variables removed from said second linearized dynamic model;

externally emulating desired regulatory control schemes via mathematical emulators to emulate PID controllers in either manual, cascade, or automatic modes.

17. An off-line process simulator created from an empirical dynamic model by the method of claim 16.

* * * * *